United States Patent [19]

Mihara et al.

[11] Patent Number: 5,506,601
[45] Date of Patent: Apr. 9, 1996

[54] LIQUID CRYSTAL APPARATUS

[75] Inventors: Tadashi Mihara, Kawasaki; Hiroshi Inoue, Yokohama; Atsushi Mizutome, Fujisawa; Akira Tsuboyama, Sagamihara; Osamu Taniguchi, Chigasaki; Yoshihiro Onitsuka, Yokohama, all of Japan

[73] Assignee: Canon Kabushiki Kaisha, Tokyo, Japan

[21] Appl. No.: 220,572

[22] Filed: Mar. 31, 1994

Related U.S. Application Data

[60] Continuation of Ser. No. 735,613, Jul. 24, 1991, abandoned, which is a division of Ser. No. 271,240, Nov. 14, 1988, Pat. No. 5,058,994.

[30] Foreign Application Priority Data

| Nov. 12, 1987 | [JP] | Japan | 62-287172 |
| Jan. 6, 1988 | [JP] | Japan | 63-001531 |
| Oct. 21, 1988 | [JP] | Japan | 63-266715 |

[51] Int. Cl.$^6$ ................................. G09G 3/36
[52] U.S. Cl. .................. 345/103; 345/100; 345/94
[58] Field of Search ..................... 345/89, 94, 97, 345/98, 99, 100, 103; 359/55, 56, 87

[56] References Cited

U.S. PATENT DOCUMENTS

| 4,367,924 | 1/1983 | Clark et al. ............... 350/334 |
| 4,548,476 | 10/1985 | Kaneko .................... 350/350 S |
| 4,602,292 | 7/1986 | Togashi et al. ............ 358/241 |
| 4,655,561 | 4/1987 | Kanbe et al. .............. 350/350 S |
| 4,660,030 | 4/1987 | Maezawa .................. 340/784 |
| 4,694,349 | 9/1987 | Takeda et al. ............. 358/241 |
| 4,808,991 | 2/1989 | Tachiuchi et al. .......... 340/793 |
| 4,816,816 | 3/1989 | Usui ....................... 340/784 |
| 4,836,656 | 6/1989 | Mouri et al. .............. 350/350 |
| 4,845,473 | 7/1989 | Matsushita et al. ......... 340/784 |
| 4,908,710 | 3/1990 | Wakai et al. .............. 358/236 |
| 4,922,241 | 5/1990 | Inoue et al. .............. 340/784 |
| 5,146,213 | 9/1992 | Brunel et al. ............. 340/793 |

FOREIGN PATENT DOCUMENTS

| 3607884 | 6/1985 | Australia ................ G02F 1/137 |
| 149899 | 7/1985 | European Pat. Off. ....... G09G 3/36 |
| 0197742 | 10/1986 | European Pat. Off. . |
| 56-107216 | 8/1981 | Japan ..................... G02F 1/137 |
| 42326 | 7/1985 | Japan ..................... G01G 49/00 |
| 272724 | 12/1986 | Japan ..................... 350/332 |
| 2185614 | 7/1987 | United Kingdom . |

Primary Examiner—Richard Hjerpe
Assistant Examiner—Xiao M. Wu
Attorney, Agent, or Firm—Fitzpatrick, Cella, Harper & Scinto

[57] ABSTRACT

A liquid crystal apparatus comprises a) a liquid crystal device comprising an electrode matrix composed of scanning electrodes and data electrodes, and a ferroelectric liquid crystal; and b) a driving means. The driving means includes a first drive means for applying a scanning selection signal two or more scanning electrodes apart in one vertical scanning so at to effect in one picture scanning in plural times of vertical scanning, and a second drive means for applying data signals in synchronism with the scanning selection signal.

8 Claims, 57 Drawing Sheets

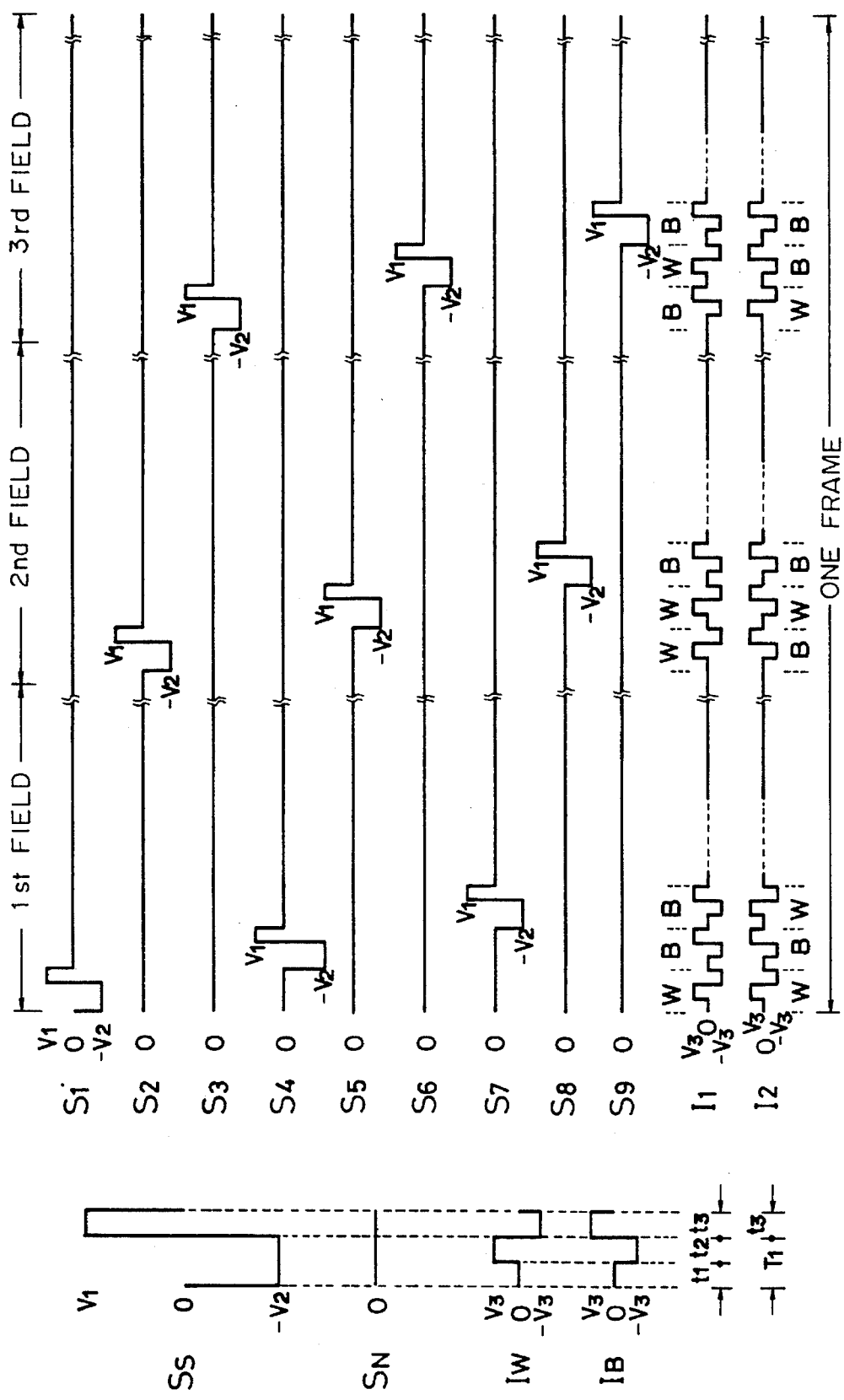

| | | (4M-3) FIELD F4M-3 (M=1,2,3,...) | (4M-2) FIELD F4M-2 (M=1,2,3,...) | (4M-1) FIELD F4M-1 (M=1,2,3,...) | 4M FIELD F4M (M=1,2,3,...) |
|---|---|---|---|---|---|
| SCAN SIGNAL | S.S. SIGNAL TO (4n-3)th S.E. S4n-3 (n=1,2,3,...) | 2Vo / 0 / -2Vo | NO SCAN (S.N. SIGNAL) | 2Vo / 0 / -2Vo | NO SCAN (S.N. SIGNAL) |
| | S.S. SIGNAL TO (4n-2)th S.E. S4n-2 (n=1,2,3,...) | NO SCAN (S.N. SIGNAL) | 2Vo / 0 / -2Vo | NO SCAN (S.N. SIGNAL) | 2Vo / 0 / -2Vo |
| | S.S. SIGNAL TO (4n-1)th S.E. S4n-1 (n=1,2,3,...) | 2Vo / 0 / -2Vo | NO SCAN (S.N. SIGNAL) | 2Vo / 0 / -2Vo | NO SCAN (S.N. SIGNAL) |
| | S.S. SIGNAL TO 4n-th S.E. S4n (n=1,2,3,...) | NO SCAN (S.N. SIGNAL) | 2Vo / 0 / -2Vo | NO SCAN (S.N. SIGNAL) | 2Vo / 0 / -2Vo |
| | S.N. SIGNAL | 0 —— | 0 —— | 0 —— | 0 —— |

S. S. = SCANNING SELECTION
S. N. = SCANNING NON-SELECTION
S. E. = SCANNING ELECTRODE

FIG. 6A

| DATA SIGNAL | (4M-3) FIELD F4M-3 (M=1.2.3.---) | (4M-2) FIELD F4M-2 (M=1.2.3.---) | (4M-1) FIELD F4M-1 (M=1.2.3.---) | 4M FIELD F4M (M=1.2.3.---) |
|---|---|---|---|---|
| SYNCH. WITH S4n-3 | "W" 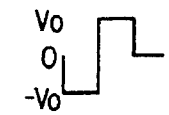 H.S. 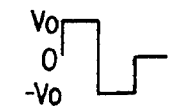 | | "B" 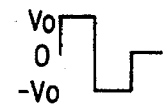 H.S. 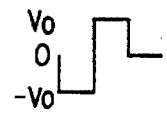 | |
| SYNCH. WITH S4n-2 | | "W" 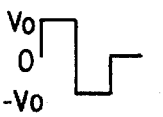 H.S. 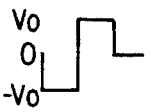 | | "B"  H.S. 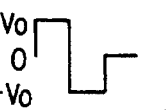 |
| SYNCH. WITH S4n-1 | "B" 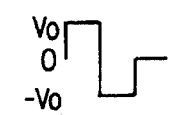 H.S. 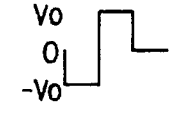 | | "W" 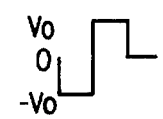 H.S. 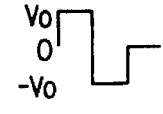 | |
| SYNCH. WITH S4n | | "B" 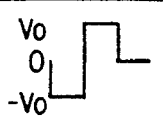 H.S. 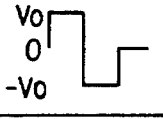 | | "W" 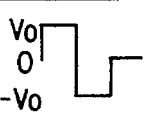 H.S. 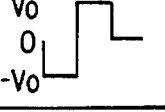 |
"W" = WHITE SIGNAL
"B" = BLACK SIGNAL
HS = HOLD SIGNAL
F I G. 6B

|  | (4M-3) FIELD F4M-3 (M=1,2,3,...) | (4M-2) FIELD F4M-2 (M=1,2,3,...) | (4M-1) FIELD F4M-1 (M=1,2,3,...) | 4M FIELD F4M (M=1,2,3,...) |
|---|---|---|---|---|
| S.S. SIGNAL TO (4n-3)th S.E. S4n-3 (n=1,2,3,...) | 2Vo / 0 / -2Vo (pulse) | NO SCAN (S.N. SIGNAL) | 2Vo / 0 / -2Vo (pulse) | NO SCAN (S.N. SIGNAL) |
| S.S. SIGNAL TO (4n-2)th S.E. S4n-2 (n=1,2,3,...) | NO SCAN (S.N. SIGNAL) | 2Vo / 0 / -2Vo (pulse) | NO SCAN (S.N. SIGNAL) | 2Vo / 0 / -2Vo (pulse) |
| S.S. SIGNAL TO (4n-1)th S.E. S4n-1 (n=1,2,3,...) | 2Vo / 0 / -2Vo (pulse) | NO SCAN (S.N. SIGNAL) | 2Vo / 0 / -2Vo (pulse) | NO SCAN (S.N. SIGNAL) |
| S.S. SIGNAL TO 4n-th S.E. S4n (n=1,2,3,...) | NO SCAN (S.N. SIGNAL) | 2Vo / 0 / -2Vo (pulse) | NO SCAN (S.N. SIGNAL) | 2Vo / 0 / -2Vo (pulse) |
| S.N. SIGNAL | 0 —— | 0 —— | 0 —— | 0 —— |

(SCAN SIGNAL)

FIG. 8A

| DATA SIGNAL | | (4M-3) FIELD F4M-3 (M=1,2,3,...) | (4M-2) FIELD F4M-2 (M=1,2,3,...) | (4M-1) FIELD F4M-1 (M=1,2,3,...) | 4M FIELD F4M (M=1,2,3,...) |
|---|---|---|---|---|---|
| | SYNCH. WITH S4n-3 | "W" <br> Vo/0/-Vo <br> H.S. <br> Vo/0/-Vo | | "B" <br> Vo/0/-Vo <br> H.S. <br> Vo/0/-Vo | |
| | SYNCH. WITH S4n-2 | | "W" <br> Vo/0/-Vo <br> H.S. <br> Vo/0/-Vo | | "B" <br> Vo/0/-Vo <br> H.S. <br> Vo/0/-Vo |
| | SYNCH. WITH S4n-1 | "B" <br> Vo/0/-Vo <br> H.S. <br> Vo/0/-Vo | | "W" <br> Vo/0/-Vo <br> H.S. <br> Vo/0/-Vo | |
| | SYNCH. WITH S4n | | "B" <br> Vo/0/-Vo <br> H.S. <br> Vo/0/-Vo | | "W" <br> Vo/0/-Vo <br> H.S. <br> Vo/0/-Vo |

FIG. 8B

| | | (4M-3) FIELD F4M-3 (M=1.2.3...) | (4M-2) FIELD F4M-2 (M=1.2.3...) | (4M-1) FIELD F4M-1 (M=1.2.3...) | 4M FIELD F4M (M=1.2.3...) |
|---|---|---|---|---|---|
| SCAN SIGNAL | S.S. SIGNAL TO (4n-3)th S.E. S4n-3 (n=1.2.3...) | 2Vo / 0 / -2Vo | NO SCAN (S.N. SIGNAL) | 2Vo / 0 / -2Vo | NO SCAN (S.N. SIGNAL) |
| | S.S. SIGNAL TO (4n-2)th S.E. S4n-2 (n=1.2.3...) | NO SCAN (S.N. SIGNAL) | 2Vo / 0 / -2Vo | NO SCAN (S.N. SIGNAL) | 2Vo / 0 / -2Vo |
| | S.S. SIGNAL TO (4n-1)th S.E. S4n-1 (n=1.2.3...) | 2Vo / 0 / -2Vo | NO SCAN (S.N. SIGNAL) | 2Vo / 0 / -2Vo | NO SCAN (S.N. SIGNAL) |
| | S.S. SIGNAL TO 4n-th S.E. S4n (n=1.2.3...) | NO SCAN (S.N. SIGNAL) | 2Vo / 0 / -2Vo | NO SCAN (S.N. SIGNAL) | 2Vo / 0 / -2Vo |
| | S.N. SIGNAL | 0 —— | 0 —— | 0 —— | 0 —— |

FIG. 10A

| | (4M-3) FIELD F4M-3 (M=1.2.3.---) | (4M-2) FIELD F4M-2 (M=1.2.3.---) | (4M-1) FIELD F4M-1 (M=1.2.3.---) | 4M FIELD F4M (M=1.2.3.---) |
|---|---|---|---|---|
| S.S. SIGNAL TO (4n-3)th S.E. S4n-3 (n=1.2.3.---) | $2V_0$ / $0$ / $-2V_0$ | NO SCAN (S.N. SIGNAL) | $2V_0$ / $0$ / $-2V_0$ | NO SCAN (S.N. SIGNAL) |
| S.S. SIGNAL TO (4n-2)th S.E. S4n-2 (n=1.2.3.---) | NO SCAN (S.N. SIGNAL) | $2V_0$ / $0$ / $-2V_0$ | NO SCAN (S.N. SIGNAL) | $2V_0$ / $0$ / $-2V_0$ |
| S.S. SIGNAL TO (4n-1)th S.E. S4n-1 (n=1.2.3.---) | $2V_0$ / $0$ / $-2V_0$ | NO SCAN (S.N. SIGNAL) | $2V_0$ / $0$ / $-2V_0$ | NO SCAN (S.N. SIGNAL) |
| S.S. SIGNAL TO 4n-th S.E. S4n (n=1.2.3.---) | NO SCAN (S.N. SIGNAL) | $2V_0$ / $0$ / $-2V_0$ | NO SCAN (S.N. SIGNAL) | $2V_0$ / $0$ / $-2V_0$ |
| S.N. SIGNAL | 0 —— | 0 —— | 0 —— | 0 —— |

(SCAN SIGNAL)

FIG. 11A

| | (4M-3) FIELD F4M-3 (M=1.2.3.---) | (4M-2) FIELD F4M-2 (M=1.2.3.---) | (4M-1) FIELD F4M-1 (M=1.2.3.---) | 4M FIELD F4M (M=1.2.3.---) |
|---|---|---|---|---|
| S.S. SIGNAL TO (4n-3)th S.E. S4n-3 (n=1.2.3.---) | 2Vo / 0 / -2Vo | NO SCAN (S.N. SIGNAL) | 2Vo / 0 / -2Vo | NO SCAN (S.N. SIGNAL) |
| S.S. SIGNAL TO (4n-2)th S.E. S4n-2 (n=1.2.3.---) | NO SCAN (S.N. SIGNAL) | 2Vo / 0 / -2Vo | NO SCAN (S.N. SIGNAL) | 2Vo / 0 / -2Vo |
| S.S. SIGNAL TO (4n-1)th S.E. S4n-1 (n=1.2.3.---) | 2Vo / 0 / -2Vo | NO SCAN (S.N. SIGNAL) | 2Vo / 0 / -2Vo | NO SCAN (S.N. SIGNAL) |
| S.S. SIGNAL TO 4n-th S.E. S4n (n=1.2.3.---) | NO SCAN (S.N. SIGNAL) | 2Vo / 0 / -2Vo | NO SCAN (S.N. SIGNAL) | 2Vo / 0 / -2Vo |
| S.N. SIGNAL | 0——— | 0——— | 0——— | 0——— |

(SCAN SIGNAL)

FIG. 13A

| SCAN SIGNAL | | (6M-5) FIELD F6M-5 (M=1,2,3,...) | (6M-4)th FIELD & 6M FIELD F6M-4 & F6M (M=1,2,3,...) | (6M-3)th FIELD & (6M-1)FIELD F6M-3 & F6M-1 (M=1,2,3,...) | (6M-2) FIELD F6M-2 (M=1,2,3,...) |
|---|---|---|---|---|---|
| | S.S. SIGNAL TO (6n-5)th S.E. S6n-5 (n=1,2,3,...) | 2Vo / 0 / -2Vo | NO SCAN (S.N. SIGNAL) | 2Vo / 0 / -2Vo | NO SCAN (S.N. SIGNAL) |
| | S.S. SIGNAL TO (6n-4)th S.E. S6n-4 (n=1,2,3,...) | NO SCAN (S.N. SIGNAL) | 2Vo / 0 / -2Vo | NO SCAN (S.N. SIGNAL) | 2Vo / 0 / -2Vo |
| | S.S. SIGNAL TO (6n-3)th S.E. S6n-3 (n=1,2,3,...) | 2Vo / 0 / -2Vo | NO SCAN (S.N. SIGNAL) | 2Vo / 0 / -2Vo | NO SCAN (S.N. SIGNAL) |
| | S.S. SIGNAL TO (6n-2)th S.E. S6n-2 (n=1,2,3,...) | NO SCAN (S.N. SIGNAL) | 2Vo / 0 / -2Vo | NO SCAN (S.N. SIGNAL) | 2Vo / 0 / -2Vo |
| | S.S. SIGNAL TO (6n-1)th S.E. S6n-1 (n=1,2,3,...) | 2Vo / 0 / -2Vo | NO SCAN (S.N. SIGNAL) | 2Vo / 0 / -2Vo | NO SCAN (S.N. SIGNAL) |
| | S.S. SIGNAL TO 6n-th S.E. S6n (n=1,2,3,...) | NO SCAN (S.N. SIGNAL) | 2Vo / 0 / -2Vo | NO SCAN (S.N. SIGNAL) | 2Vo / 0 / -2Vo |
| | S.N. SIGNAL | 0 —— | 0 —— | 0 —— | 0 —— |

FIG. 14A

| SCAN SIGNAL | | (8M-7) FIELD F8M-7 (M=1,2,3,...) | (8M-6) FIELD F8M-6 (M=1,2,3,...) | (8M-5) FIELD F8M-5 (M=1,2,3,...) | (8M-4) FIELD F8M-4 (M=1,2,3,...) |
|---|---|---|---|---|---|
| | S.S. SIGNAL TO (8n-7)th S.E. S8n-7 (n=1,2,3,...) | 2Vo / 0 / -2Vo | NO SCAN (S.N. SIGNAL) | NO SCAN (S.N. SIGNAL) | NO SCAN (S.N. SIGNAL) |
| | S.S. SIGNAL TO (8n-6)th S.E. S8n-6 (n=1,2,3,...) | NO SCAN (S.N. SIGNAL) | 2Vo / 0 / -2Vo | NO SCAN (S.N. SIGNAL) | NO SCAN (S.N. SIGNAL) |
| | S.S. SIGNAL TO (8n-5)th S.E. S8n-5 (n=1,2,3,...) | NO SCAN (S.N. SIGNAL) | NO SCAN (S.N. SIGNAL) | 2Vo / 0 / -2Vo | NO SCAN (S.N. SIGNAL) |
| | S.S. SIGNAL TO (8n-4)th S.E. S8n-4 (n=1,2,3,...) | NO SCAN (S.N. SIGNAL) | NO SCAN (S.N. SIGNAL) | NO SCAN (S.N. SIGNAL) | 2Vo / 0 / -2Vo |
| | S.S. SIGNAL TO (8n-3)th S.E. S8n-3 (n=1,2,3,...) | 2Vo / 0 / -2Vo | NO SCAN (S.N. SIGNAL) | NO SCAN (S.N. SIGNAL) | NO SCAN (S.N. SIGNAL) |
| | S.S. SIGNAL TO (8n-2)th S.E. S8n-2 (n=1,2,3,...) | NO SCAN (S.N. SIGNAL) | 2Vo / 0 / -2Vo | NO SCAN (S.N. SIGNAL) | NO SCAN (S.N. SIGNAL) |
| | S.S. SIGNAL TO (8n-1)th S.E. S8n-1 (n=1,2,3,...) | NO SCAN (S.N. SIGNAL) | NO SCAN (S.N. SIGNAL) | 2Vo / 0 / -2Vo | NO SCAN (S.N. SIGNAL) |
| | S.S. SIGNAL TO 8n-th S.E. S8n (n=1,2,3,...) | NO SCAN (S.N. SIGNAL) | NO SCAN (S.N. SIGNAL) | NO SCAN (S.N. SIGNAL) | 2Vo / 0 / -2Vo |
| | S.N. SIGNAL | 0 —— | 0 —— | 0 —— | 0 —— |

FIG. 15A-1

| | | (8M-3) FIELD F8M-3 (M=1.2.3.⋯) | (8M-2) FIELD F8M-2 (M=1.2.3.⋯) | (8M-1) FIELD F8M-1 (M=1.2.3.⋯) | 8M FIELD F8M (M=1.2.3.⋯) |
|---|---|---|---|---|---|
| SCAN SIGNAL | S.S. SIGNAL TO (8n-7)th S.E. S8n-7 (n=1.2.3.⋯) | 2Vo, 0, -2Vo waveform | NO SCAN (S.N. SIGNAL) | NO SCAN (S.N. SIGNAL) | NO SCAN (S.N. SIGNAL) |
| | S.S. SIGNAL TO (8n-6)th S.E. S8n-6 (n=1.2.3.⋯) | NO SCAN (S.N. SIGNAL) | 2Vo, 0, -2Vo waveform | NO SCAN (S.N. SIGNAL) | NO SCAN (S.N. SIGNAL) |
| | S.S. SIGNAL TO (8n-5)th S.E. S8n-5 (n=1.2.3.⋯) | NO SCAN (S.N. SIGNAL) | NO SCAN (S.N. SIGNAL) | 2Vo, 0, -2Vo waveform | NO SCAN (S.N. SIGNAL) |
| | S.S. SIGNAL TO (8n-4)th S.E. S8n-4 (n=1.2.3.⋯) | NO SCAN (S.N. SIGNAL) | NO SCAN (S.N. SIGNAL) | NO SCAN (S.N. SIGNAL) | 2Vo, 0, -2Vo waveform |
| | S.S. SIGNAL TO (8n-3)th S.E. S8n-3 (n=1.2.3.⋯) | 2Vo, 0, -2Vo waveform | NO SCAN (S.N. SIGNAL) | NO SCAN (S.N. SIGNAL) | NO SCAN (S.N. SIGNAL) |
| | S.S. SIGNAL TO (8n-2)th S.E. S8n-2 (n=1.2.3.⋯) | NO SCAN (S.N. SIGNAL) | 2Vo, 0, -2Vo waveform | NO SCAN (S.N. SIGNAL) | NO SCAN (S.N. SIGNAL) |
| | S.S. SIGNAL TO (8n-1)th S.E. S8n-1 (n=1.2.3.⋯) | NO SCAN (S.N. SIGNAL) | NO SCAN (S.N. SIGNAL) | 2Vo, 0, -2Vo waveform | NO SCAN (S.N. SIGNAL) |
| | S.S. SIGNAL TO 8n-th S.E. S8n (n=1.2.3.⋯) | NO SCAN (S.N. SIGNAL) | NO SCAN (S.N. SIGNAL) | NO SCAN (S.N. SIGNAL) | 2Vo, 0, -2Vo waveform |
| | S.N. SIGNAL | 0 ——— | 0 ——— | 0 ——— | 0 ——— |

| | (8M-3) FIELD F8M-3 (M=1.2.3.⋯) | (8M-2) FIELD F8M-2 (M=1.2.3.⋯) | (8M-1) FIELD F8M-1 (M=1.2.3.⋯) | 8M FIELD F8M (M=1.2.3.⋯) |
|---|---|---|---|---|
| SYNCH. WITH S8n-7 | "B" Vo/0/-Vo H.S. Vo/0/-Vo | | | |
| SYNCH. WITH S8n-6 | | "B" Vo/0/-Vo H.S. Vo/0/-Vo | | |
| SYNCH. WITH S8n-5 | | | "B" Vo/0/-Vo H.S. Vo/0/-Vo | |
| SYNCH. WITH S8n-4 | | | | "B" Vo/0/-Vo H.S. Vo/0/-Vo |

(DATA SIGNAL)

FIG. 15B-2

|  | (8M-7) FIELD F8M-7 (M=1.2.3.⋯) | (8M-6) FIELD F8M-6 (M=1.2.3.⋯) | (8M-5) FIELD F8M-5 (M=1.2.3.⋯) | (8M-4) FIELD F8M-4 (M=1.2.3.⋯) |
|---|---|---|---|---|
| S.S. SIGNAL TO (8n-7)th S.E. S8n-7 (n=1.2.3.⋯) | 2Vo / 0 / -2Vo | NO SCAN (S.N. SIGNAL) | NO SCAN (S.N. SIGNAL) | NO SCAN (S.N. SIGNAL) |
| S.S. SIGNAL TO (8n-6)th S.E. S8n-6 (n=1.2.3.⋯) | NO SCAN (S.N. SIGNAL) | NO SCAN (S.N. SIGNAL) | 2Vo / 0 / -2Vo | NO SCAN (S.N. SIGNAL) |
| S.S. SIGNAL TO (8n-5)th S.E. S8n-5 (n=1.2.3.⋯) | NO SCAN (S.N. SIGNAL) | 2Vo / 0 / -2Vo | NO SCAN (S.N. SIGNAL) | NO SCAN (S.N. SIGNAL) |
| S.S. SIGNAL TO (8n-4)th S.E. S8n-4 (n=1.2.3.⋯) | NO SCAN (S.N. SIGNAL) | NO SCAN (S.N. SIGNAL) | NO SCAN (S.N. SIGNAL) | 2Vo / 0 / -2Vo |
| S.S. SIGNAL TO (8n-3)th S.E. S8n-3 (n=1.2.3.⋯) | 2Vo / 0 / -2Vo | NO SCAN (S.N. SIGNAL) | NO SCAN (S.N. SIGNAL) | NO SCAN (S.N. SIGNAL) |
| S.S. SIGNAL TO (8n-2)th S.E. S8n-2 (n=1.2.3.⋯) | NO SCAN (S.N. SIGNAL) | NO SCAN (S.N. SIGNAL) | 2Vo / 0 / -2Vo | NO SCAN (S.N. SIGNAL) |
| S.S. SIGNAL TO (8n-1)th S.E. S8n-1 (n=1.2.3.⋯) | NO SCAN (S.N. SIGNAL) | 2Vo / 0 / -2Vo | NO SCAN (S.N. SIGNAL) | NO SCAN (S.N. SIGNAL) |
| S.S. SIGNAL TO 8n-th S.E. S8n (n=1.2.3.⋯) | NO SCAN (S.N. SIGNAL) | NO SCAN (S.N. SIGNAL) | NO SCAN (S.N. SIGNAL) | 2Vo / 0 / -2Vo |
| S.N. SIGNAL | 0 —— | 0 —— | 0 —— | 0 —— |

FIG. 16A-1

| | | (8M-3) FIELD F8M-3 (M=1.2.3.⋯) | (8M-2) FIELD F8M-2 (M=1.2.3.⋯) | (8M-1) FIELD F8M-1 (M=1.2.3.⋯) | 8M FIELD F8M (M=1.2.3.⋯) |
|---|---|---|---|---|---|
| SCAN SIGNAL | S.S. SIGNAL TO (8n-7)th S.E. S8n-7 (n=1.2.3.⋯) | $2V_0$ / $0$ / $-2V_0$ | NO SCAN (S.N. SIGNAL) | NO SCAN (S.N. SIGNAL) | NO SCAN (S.N. SIGNAL) |
| | S.S. SIGNAL TO (8n-6)th S.E. S8n-6 (n=1.2.3.⋯) | NO SCAN (S.N. SIGNAL) | NO SCAN (S.N. SIGNAL) | $2V_0$ / $0$ / $-2V_0$ | NO SCAN (S.N. SIGNAL) |
| | S.S. SIGNAL TO (8n-5)th S.E. S8n-5 (n=1.2.3.⋯) | NO SCAN (S.N. SIGNAL) | $2V_0$ / $0$ / $-2V_0$ | NO SCAN (S.N. SIGNAL) | NO SCAN (S.N. SIGNAL) |
| | S.S. SIGNAL TO (8n-4)th S.E. S8n-4 (n=1.2.3.⋯) | NO SCAN (S.N. SIGNAL) | NO SCAN (S.N. SIGNAL) | NO SCAN (S.N. SIGNAL) | $2V_0$ / $0$ / $-2V_0$ |
| | S.S. SIGNAL TO (8n-3)th S.E. S8n-3 (n=1.2.3.⋯) | $2V_0$ / $0$ / $-2V_0$ | NO SCAN (S.N. SIGNAL) | NO SCAN (S.N. SIGNAL) | NO SCAN (S.N. SIGNAL) |
| | S.S. SIGNAL TO (8n-2)th S.E. S8n-2 (n=1.2.3.⋯) | NO SCAN (S.N. SIGNAL) | NO SCAN (S.N. SIGNAL) | $2V_0$ / $0$ / $-2V_0$ | NO SCAN (S.N. SIGNAL) |
| | S.S. SIGNAL TO (8n-1)th S.E. S8n-1 (n=1.2.3.⋯) | NO SCAN (S.N. SIGNAL) | $2V_0$ / $0$ / $-2V_0$ | NO SCAN (S.N. SIGNAL) | NO SCAN (S.N. SIGNAL) |
| | S.S. SIGNAL TO 8n-th S.E. S8n (n=1.2.3.⋯) | NO SCAN (S.N. SIGNAL) | NO SCAN (S.N. SIGNAL) | NO SCAN (S.N. SIGNAL) | $2V_0$ / $0$ / $-2V_0$ |
| | S.N. SIGNAL | 0 —— | 0 —— | 0 —— | 0 —— |

FIG. 16A-2

| | (8M-3) FIELD F8M-3 (M=1,2,3,...) | (8M-2) FIELD F8M-2 (M=1,2,3,...) | (8M-1) FIELD F8M-1 (M=1,2,3,...) | 8M FIELD F8M (M=1,2,3,...) |
|---|---|---|---|---|
| SYNCH. WITH S8n-3 | "W" / Vo,0,-Vo / H.S. / Vo,0,-Vo | | | |
| SYNCH. WITH S8n-2 | | | "W" / Vo,0,-Vo / H.S. / Vo,0,-Vo | |
| SYNCH. WITH S8n-1 | | "W" / Vo,0,-Vo / H.S. / Vo,0,-Vo | | |
| SYNCH. WITH S8n | | | | "W" / Vo,0,-Vo / H.S. / Vo,0,-Vo |

(Left axis label: DATA SIGNAL)

FIG. 16B-4

|  | (8M-7) FIELD F8M-7 (M=1,2,3,...) | (8M-6) FIELD F8M-6 (M=1,2,3,...) | (8M-5) FIELD F8M-5 (M=1,2,3,...) | (8M-4) FIELD F8M-4 (M=1,2,3,...) |
|---|---|---|---|---|
| S.S. SIGNAL TO (8n-7)th S.E. S8n-7 (n=1,2,3,...) | 2Vo, 0, -2Vo pulse | NO SCAN (S.N. SIGNAL) | NO SCAN (S.N. SIGNAL) | NO SCAN (S.N. SIGNAL) |
| S.S. SIGNAL TO (8n-6)th S.E. S8n-6 (n=1,2,3,...) | NO SCAN (S.N. SIGNAL) | NO SCAN (S.N. SIGNAL) | NO SCAN (S.N. SIGNAL) | 2Vo, 0, -2Vo pulse |
| S.S. SIGNAL TO (8n-5)th S.E. S8n-5 (n=1,2,3,...) | NO SCAN (S.N. SIGNAL) | NO SCAN (S.N. SIGNAL) | 2Vo, 0, -2Vo pulse | NO SCAN (S.N. SIGNAL) |
| S.S. SIGNAL TO (8n-4)th S.E. S8n-4 (n=1,2,3,...) | NO SCAN (S.N. SIGNAL) | 2Vo, 0, -2Vo pulse | NO SCAN (S.N. SIGNAL) | NO SCAN (S.N. SIGNAL) |
| S.S. SIGNAL TO (8n-3)th S.E. S8n-3 (n=1,2,3,...) | 2Vo, 0, -2Vo pulse | NO SCAN (S.N. SIGNAL) | NO SCAN (S.N. SIGNAL) | NO SCAN (S.N. SIGNAL) |
| S.S. SIGNAL TO (8n-2)th S.E. S8n-2 (n=1,2,3,...) | NO SCAN (S.N. SIGNAL) | NO SCAN (S.N. SIGNAL) | NO SCAN (S.N. SIGNAL) | 2Vo, 0, -2Vo pulse |
| S.S. SIGNAL TO (8n-1)th S.E. S8n-1 (n=1,2,3,...) | NO SCAN (S.N. SIGNAL) | NO SCAN (S.N. SIGNAL) | 2Vo, 0, -2Vo pulse | NO SCAN (S.N. SIGNAL) |
| S.S. SIGNAL TO 8n-th S.E. S8n (n=1,2,3,...) | NO SCAN (S.N. SIGNAL) | 2Vo, 0, -2Vo pulse | NO SCAN (S.N. SIGNAL) | NO SCAN (S.N. SIGNAL) |
| S.N. SIGNAL | 0 —— | 0 —— | 0 —— | 0 —— |

FIG. 17A-1

| SCAN SIGNAL | | (8M-3) FIELD F8M-3 (M=1.2.3.⋯) | (8M-2) FIELD F8M-2 (M=1.2.3.⋯) | (8M-1) FIELD F8M-1 (M=1.2.3.⋯) | 8M FIELD F8M (M=1.2.3.⋯) |
|---|---|---|---|---|---|
| | S.S. SIGNAL TO (8n-7)th S.E. S8n-7 (n=1.2.3.⋯) | 2Vo / 0 / -2Vo | NO SCAN (S.N. SIGNAL) | NO SCAN (S.N. SIGNAL) | NO SCAN (S.N. SIGNAL) |
| | S.S. SIGNAL TO (8n-6)th S.E. S8n-6 (n=1.2.3.⋯) | NO SCAN (S.N. SIGNAL) | NO SCAN (S.N. SIGNAL) | NO SCAN (S.N. SIGNAL) | 2Vo / 0 / -2Vo |
| | S.S. SIGNAL TO (8n-5)th S.E. S8n-5 (n=1.2.3.⋯) | NO SCAN (S.N. SIGNAL) | NO SCAN (S.N. SIGNAL) | 2Vo / 0 / -2Vo | NO SCAN (S.N. SIGNAL) |
| | S.S. SIGNAL TO (8n-4)th S.E. S8n-4 (n=1.2.3.⋯) | NO SCAN (S.N. SIGNAL) | 2Vo / 0 / -2Vo | NO SCAN (S.N. SIGNAL) | NO SCAN (S.N. SIGNAL) |
| | S.S. SIGNAL TO (8n-3)th S.E. S8n-3 (n=1.2.3.⋯) | 2Vo / 0 / -2Vo | NO SCAN (S.N. SIGNAL) | NO SCAN (S.N. SIGNAL) | NO SCAN (S.N. SIGNAL) |
| | S.S. SIGNAL TO (8n-2)th S.E. S8n-2 (n=1.2.3.⋯) | NO SCAN (S.N. SIGNAL) | NO SCAN (S.N. SIGNAL) | NO SCAN (S.N. SIGNAL) | 2Vo / 0 / -2Vo |
| | S.S. SIGNAL TO (8n-1)th S.E. S8n-1 (n=1.2.3.⋯) | NO SCAN (S.N. SIGNAL) | NO SCAN (S.N. SIGNAL) | 2Vo / 0 / -2Vo | NO SCAN (S.N. SIGNAL) |
| | S.S. SIGNAL TO 8n-th S.E. S8n (n=1.2.3.⋯) | NO SCAN (S.N. SIGNAL) | 2Vo / 0 / -2Vo | NO SCAN (S.N. SIGNAL) | NO SCAN (S.N. SIGNAL) |
| | S.N. SIGNAL | 0 —— | 0 —— | 0 —— | 0 —— |

FIG. 17A-2

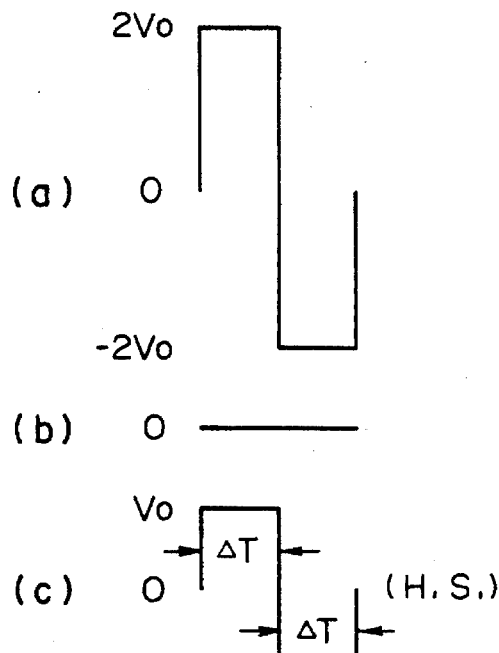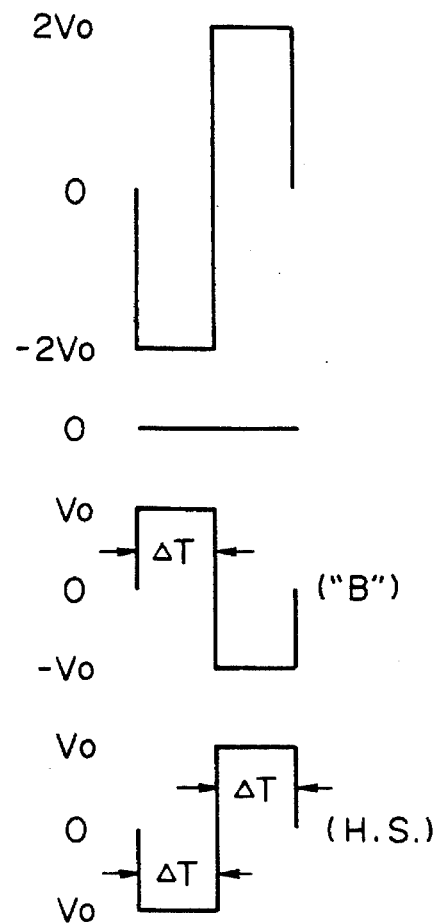
FIG. 18A    FIG. 18B
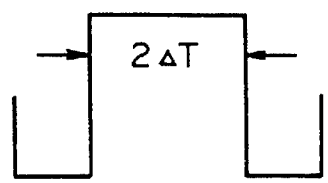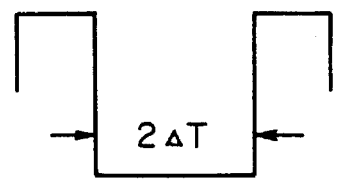
FIG. 19A    FIG. 19B

FIG. 22

|  | ODD FRAME<br>F 2M-1<br>(M=1.2.3.---) | EVEN FRAME<br>F 2M<br>(M=1.2.3.---) |
|---|---|---|
| S.S. SIGNAL<br>TO ODD S.E.<br>$S_{2n-1}$<br>(n=1.2.3.---) | Vs, 0, -Vs with $\Delta t/2$, $2\Delta t$, $\Delta t$, $\Delta t/2$ | Vs, 0, -Vs with $2\Delta t$, $\Delta t$, $\Delta t/2$, $\Delta t/2$ |
| S.S. SIGNAL<br>TO EVEN S.E.<br>$S_{2n}$<br>(n=1.2.3.---) | Vs, 0, -Vs | Vs, 0, -Vs |
| DATA SIGNAL — SYNCH. WITH $S_{2n-1}$ | "W"<br>VD, 0, -VD with $\Delta t/2$, $\Delta t/2$, $2\Delta t$, $\Delta t$<br>H.S.<br>VD, 0, -VD | "B"<br>VD, 0, -VD with $2\Delta t$, $\Delta t$, $\Delta t/2$, $\Delta t/2$<br>H.S.<br>VD, 0, -VD |
| DATA SIGNAL — SYNCH. WITH $S_{2n}$ | "B"<br>V, 0, -VD<br>H.S.<br>VD, 0, -VD | "W"<br>V, 0, -VD<br>H.S.<br>VD, 0, -VD |
| S.N. SIGNAL | 0 ——— | 0 ——— |

| | ODD FRAME<br>F2M-1<br>(M=1,2,3,---) | EVEN FRAME<br>F2M<br>(M=1,2,3,---) |
|---|---|---|
| S.S. SIGNAL<br>TO ODD S.E.<br>S2n-1<br>(n=1,2,3,---) | 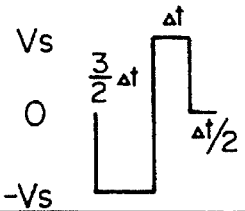 | 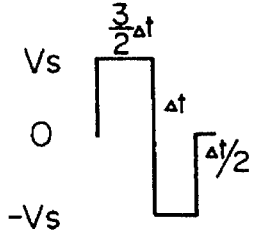 |
| S.S. SIGNAL<br>TO EVEN S.E.<br>S2n<br>(n=1,2,3,---) | 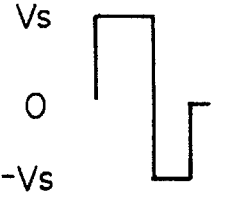 | 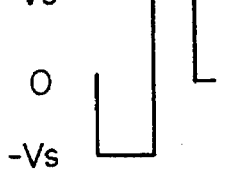 |
| DATA SIGNAL — SYNCH. WITH S2n-1 | "W"<br>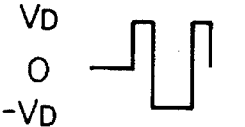<br>H.S.<br>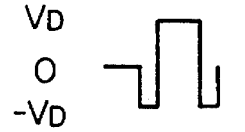 | "B"<br>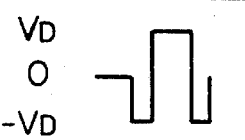<br>H.S.<br>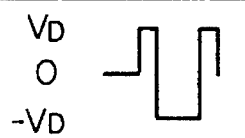 |
| DATA SIGNAL — SYNCH. WITH S2n | "B"<br><br>H.S.<br>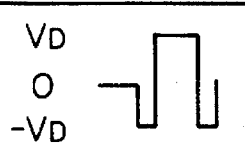 | "W"<br>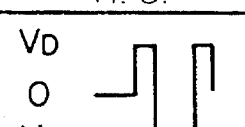<br>H.S.<br>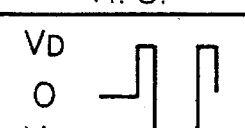 |
| S.N. SIGNAL | 0 —— | 0 —— |
FIG. 28A

| | ODD FRAME<br>F 2M-1<br>(M=1.2.3.---) | EVEN FRAME<br>F 2M<br>(M=1.2.3.---) |
|---|---|---|
| S. S. SIGNAL Sn<br>(n=1.2.3.---) | 2Vo / 0 / -2Vo | 2Vo / 0 / -2Vo |
| S. N. SIGNAL | 0 —— | 0 —— |
| DATA SIGNAL | "W"<br>Vo / 0 / -Vo<br>H. S.<br>Vo / 0 / -Vo | "B"<br>Vo / 0 / -Vo<br>H. S.<br>Vo / 0 / -Vo |

"W" = WHITE SIGNAL
"B" = BLACK SIGNAL
HS = HOLD SIGNAL
S. S. = SCANNING SELECTION
S. N. = SCANNING NON-SELECTION

F I G. 32

LIQUID CRYSTAL APPARATUS

This application is a continuation of application Ser. No. 07/735,613 filed Jul. 24, 1991, now abandoned, which is a division of application Ser. No. 07/271,240 filed Nov. 14, 1988, now U.S. Pat. No. 5,088,994.

FIELD OF THE INVENTION AND RELATED ART

The present invention relates to a liquid crystal apparatus, such as a display panel or a shutter-array printer, using a ferroelectric liquid crystal.

Hitherto, there has been well-known a type of liquid crystal display device which comprises a group of scanning electrodes and a group of signal or data electrodes arranged in a matrix, and a liquid crystal compound is filled between the electrode groups to form a large number of pixels thereby to display images or information.

These display devices are driven by a multiplexing driving method wherein an address signal is selectively applied sequentially and periodically to the group of scanning electrodes, and prescribed data signals are parallelly and selectively applied to the group of data electrodes in synchronism with the address signals.

In most of the practical devices of the type described above, TN (twisted nematic)-type liquid crystals have been used as described in "Voltage-Dependent Optical Activity of a Twisted Nematic Liquid Crystal" by M. Schadt and W. Helfrich, Applied Physics Letters, Vol. 18, No. 4, pp. 127–128.

In recent years, the use of a liquid crystal device showing bistability has been proposed by Clark and Lagerwall as an improvement to the conventional liquid crystal devices in U.S. Pat. No. 4,367,924; JP-A (Kokai) 56-107216; etc. As the bistable liquid crystal, a ferroelectric liquid crystal (hereinafter sometimes abbreviated as "FLC") showing chiral smectic C phase (SmC*) or H phase (SmH*) is generally used. The ferroelectric liquid crystal assumes either a first optically stable state or a second optically stable state in response to an electric field applied thereto and retains the resultant state in the absence of an electric field, thus showing a bistability. Further, the ferroelectric liquid crystal quickly responds to a change in electric field, and thus the ferroelectric liquid crystal device is expected to be widely used in the field of a high-speed and memory-type display apparatus, etc.

However, the above-mentioned ferroelectric liquid crystal device has involved a problem of flickering at the time of multiplex driving. For example, European Laid-Open Patent Application (EP-A) 149899 discloses a multiplex driving method comprising applying a scanning selection signal of an AC voltage the polarity of which is reversed (or the signal phase of which is reversed) for each frame to selectively write a "white" state (in combination with cross nicol polarizers arranged to provide a "bright" state at this time) in a frame and then selectively write a "black" state (in combination with the cross nicol polarizers arranged to provide a "dark" state at this time). In addition to the above driving method, those driving methods as disclosed by U.S. Pat. Nos. 4,548,476 and 4,655,561 have been known.

In such a driving method, at the time of selective writing of "black" after a selective writing of "white", a pixel selectively written in "white" in the previous frame is placed in a half-selection state, whereby the pixel is supplied with a voltage which is smaller than the writing voltage but is still effective. As a result, at the time of selective writing of "black" in the multiplex driving method, selected pixels for writing "white" constituting the background of a black image are wholly supplied with a half-selection voltage in a ½ frame cycle (½ of a reciprocal of one frame or picture scanning period) so that the optical characteristic of the white selection pixels varies in each ½ frame period. As a number of white selection pixels is much larger than the number of black selection pixels in a display of a black image, e.g., character, on a white background, the white background causes flickering. Occurrence of a similar flickering is observable also on a display of white characters on the black background opposite to the above case. In case where an ordinary frame frequency is 30 Hz, the above half-selection voltage is applied at a frequency of 15 Hz which is a ½ frame frequency, so that it is sensed by an observer as a flickering to remarkably degrade the display quality.

Particularly, in driving of a ferroelectric liquid crystal at a low temperature, it is necessary to use a longer driving pulse (scanning selection period) than that used at a ½ frame frequency of 15 Hz for a higher temperature to necessitate scanning drive at a lower ½ frame frequency of, e.g., 5–10 Hz. This leads to occurrence of a noticeable flickering due to a low frame frequency drive at a low temperature.

SUMMARY OF THE INVENTION

An object of the present invention is to provide a ferroelectric liquid crystal apparatus wherein occurrence of flickering caused by a low frame frequency scanning drive, e.g., 15 Hz or below, is suppressed.

Another object of the present invention is to provide a ferroelectric liquid crystal apparatus for realizing a gradational display free from flickering.

A further object of the present invention is to provide a ferroelectric liquid crystal apparatus with an improved display quality and a broad driving margin.

According to a first aspect of the present invention, there is provided a liquid crystal apparatus, comprising:

a) a liquid crystal device comprising an electrode matrix composed of scanning electrodes and data electrodes, and a ferroelectric liquid crystal; and b) a driving means including a first drive means for applying a scanning selection signal two or more scanning electrodes apart in one vertical scanning so as to effect one picture scanning in plural times of vertical scanning, and a second drive means for applying data signals in synchronism with the scanning selection signal.

Herein, a screen for a picture display is defined by the electrode matrix. The term "picture scanning" refers to scanning of all the scanning electrodes constituting or covering all or a prescribed part of the screen for providing a desired picture.

According to a second aspect of the present invention, there is provided a liquid crystal apparatus comprising:

a) a liquid crystal device comprising an electrode matrix composed of scanning electrodes and data electrodes, and a ferroelectric liquid crystal; and b) a driving means including a first drive means for applying a scanning selection signal two or more scanning electrodes apart in one vertical scanning so as to effect one picture scanning in plural times of vertical scanning, and so that the scanning selection signal is applied to scanning electrodes which are not adjacent to each other in at least two consecutive times of vertical scanning, and a second drive means for applying data signals in synchronism with the scanning selection signal.

According to a third aspect of the present invention, there is provided a liquid crystal apparatus comprising:

a) a liquid crystal device comprising an electrode matrix composed of scanning electrodes and data electrodes, and a ferroelectric liquid crystal, and b) a driving means including a scanning drive means and a data drive means;

said scanning drive means including: (i) means for applying to the scanning electrodes a first scanning selection signal and a second scanning selection signal having mutually different voltage waveforms in one vertical scanning period, and (ii) means for selecting scanning electrodes N scanning electrodes apart in a first vertical scanning period and selecting scanning electrodes not selected in the first vertical scanning period N scanning electrodes apart (N is an integer such as 1, 2, 3, . . .) in a second vertical scanning period so that each scanning electrode is supplied with the first and second scanning selection signals in a frame period including at least the first and second vertical scanning periods;

said data drive means being a means for applying data signals in synchronism with the scanning selection signals.

According to a fourth aspect of the present invention, there is provided a liquid crystal apparatus comprising:

a) a liquid crystal device comprising an electrode matrix composed of scanning electrodes and data electrodes, and a ferroelectric liquid crystal; and b) a driving means including:

a first drive means for applying a scanning selection signal two or more scanning electrodes apart in one vertical scanning so as to effect one picture scanning in plural times of vertical scanning, said scanning selection signal comprising a former voltage of one polarity and a latter voltage of the other polarity with respect to the voltage level of a non-selected scanning electrode; and a second drive means for applying to all or a prescribed part of the data electrodes a voltage signal providing a voltage for causing one orientation state of the ferroelectric liquid crystal in combination with said former voltage of one polarity of the scanning selection signal, and applying to a selected data electrode among said all or a prescribed part of the data electrodes a voltage signal providing a voltage for causing the other orientation state of the ferroelectric liquid crystal and to the other data electrodes a voltage signal providing a voltage not changing the previous state of the ferroelectric liquid crystal, respectively, in combination with the latter voltage of the other polarity.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 4A–4E are driving waveform diagrams used in the invention;

FIGS. 6A and 6B show a set of driving waveform diagrams used in the invention.

FIGS. 8A and 8B show another set of driving waveform diagrams used in the invention.

FIGS. 10A–10B and 11A–11B respectively show still another set of driving waveform diagrams used in the invention;

FIGS. 13A, 13B, 14A, 14B, 15A-1, 15A-2, 15B-1 to 15B-4, 16A-1, 16A-2, 16B-1 to 16B-4, 17A-1, 17A-2 and 17B-1 to 17B-4 respectively illustrate a set of driving waveforms (scanning signals or data signals) according to another embodiment of the invention;

FIGS. 18A, 18B, 19A and 19B show a set of driving waveform diagrams according to prior art;

FIGS. 22–27, 28A and 28B respectively show another set of driving waveform diagrams used in the invention;

FIG. 32 is a driving waveform diagram outside the present invention.

DESCRIPTION OF THE PREFERRED EMBODIMENTS

The present invention will be explained based on an embodiment applicable to a ferroelectric liquid crystal (FLC).

Figure 1:
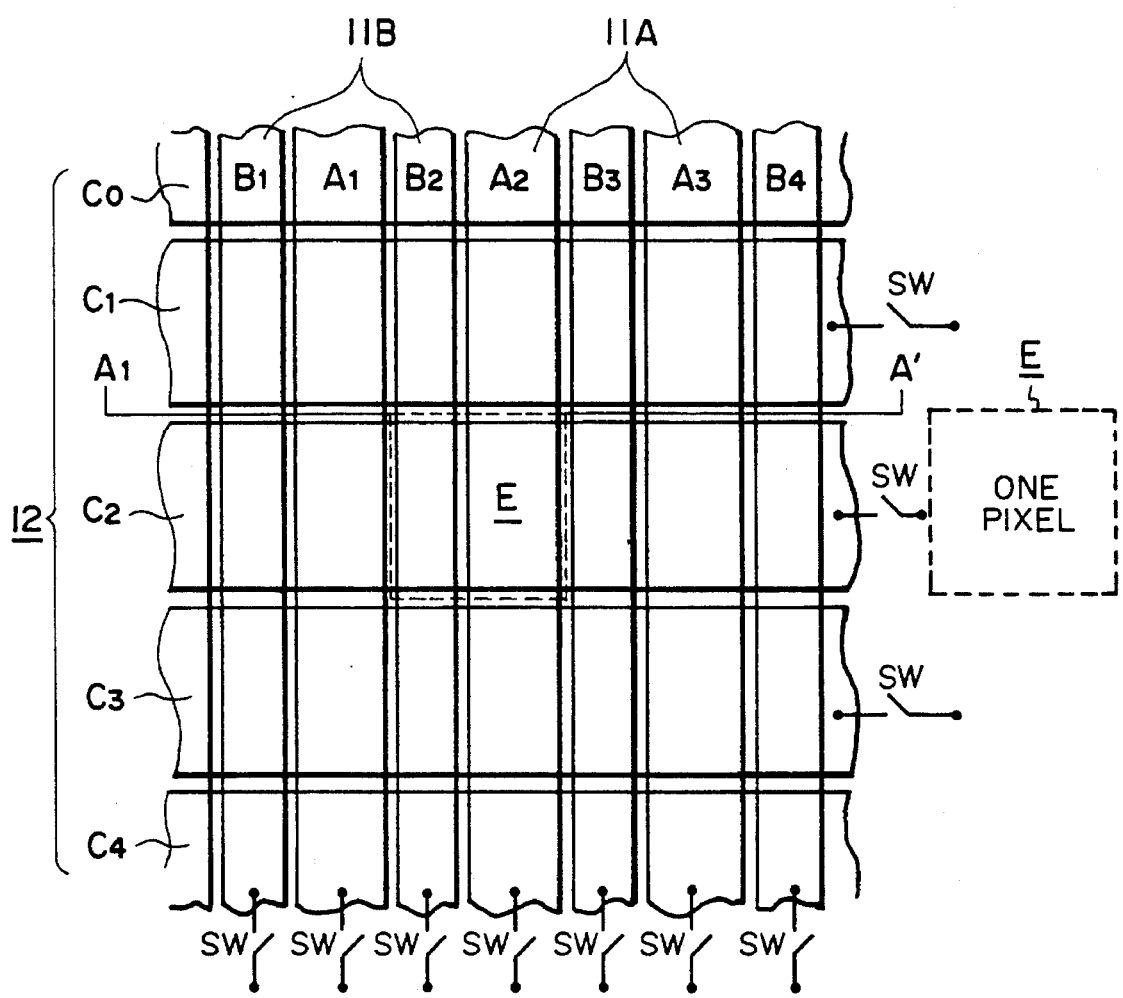
FIG. 1 is a plan view of an electrode matrix or matrix electrode structure of an FLC device used in the present invention.
Figure 2:
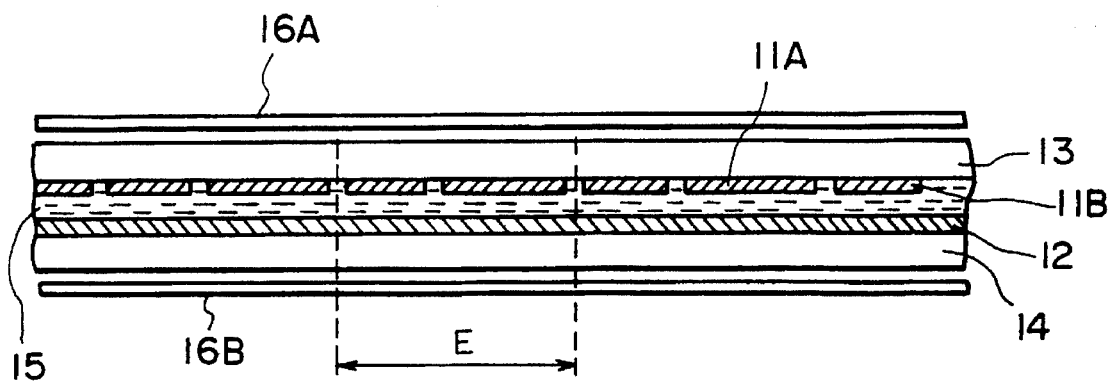
FIG. 2 is a cross-sectional view taken along the line A—A' of the FLC device shown in FIG. 1.
Figure 3:
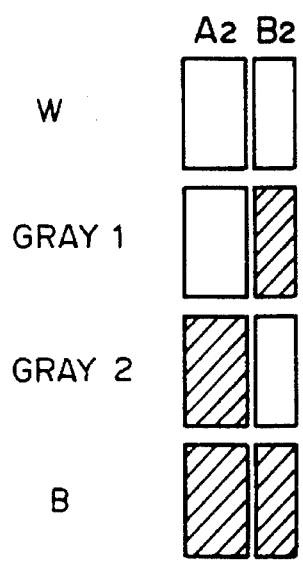
FIG. 3 is an illustration of intermediate gradations.

FIG. 1 is a schematic plan view of a matrix electrode structure of an FLC device according to an embodiment of the present invention and FIG. 2 is a cross-sectional view taken along the line A—A' in FIG. 1. Referring to these figures, the FLC device comprises upper electrodes 11A ($A_1$, $A_2$, $A_3$, ...) and 11B ($B_1$, $B_2$, $B_3$, $B_4$, . . .) constituting data electrodes, and lower electrodes 12 constituting scanning electrodes C ($C_0$, $C_1$, $C_2$, $C_3$, . . .). These data electrodes 11A, 11B and scanning electrodes 12 are formed on glass substrates 13 and 14, respectively, and mutually arranged so as to form a matrix with an FLC material 15 disposed therebetween. As shown in the figures, one pixel is constituted by a region E surrounded by a dashed line, i.e., a region where a scanning electrode C ($C_2$ is shown as an example) and two data electrodes A ($A_2$) and B ($B_2$) (electrode width: A>B). In this instance, the width of each data electrode A is a wider then an accompanying data electrode B. The scanning electrodes C and the data electrodes A, B are respectively connected to a power supply (not shown) through switches SW (or equivalents thereof). The switches SW are also connected to a controller unit (not shown) for controlling the ON/OFF of the switches. Based on this arrangement, a gray scale display in the pixel E, for example, composed of the scanning electrode $C_2$ and the data electrodes A and B, may be effected under the control by means of the controller circuit as follows. When the scanning electrode $C_2$ is selected or scanned, a white display state ("W") is given by applying a "W" signal to the data electrodes $A_2$ and $B_2$ respectively; a display state of "Gray 1" is given by applying a "W" signal to $A_2$ and a black ("B") signal to $B_2$; a display state of "Gray 2" is given by applying a "B" signal to $A_2$ and a "W" signal to $B_2$; and a black display state ("B") is given by applying a "B" signal to $A_2$ and $B_2$ respectively. FIG. 3 shows the resultant states W, Gray 1, Gray 2 and B constituting a gray scale.

In this way, a gray scale of 4 levels can be realized by using FLC which per se is essentially capable of only a binary expression.

In a preferred embodiment of the present invention, a pixel E is composed of a plural number (n) of intersections of electrodes having intersection areas giving a geometric series of ratios such as $1:2:4:8: \ldots :2^{n-1}$ (the minimum intersection area is taken as 1 (unit)).

In the present invention, if a scanning electrode is divided into two electrode stripes having widths C and D and combined with the data electrodes A and B (A≠B), 8 gradation levels can be provided when C=D and 16 gradation levels can be provided when C≠D.

Further, in case where only the data electrode side is split into electrodes A and B, if their widths are set to be equal (A=B) and color filters in complementary colors are disposed on the electrodes A and B, a color display of four colors may be possible. For example, if a complementary color relationship of A=yellow and B=blue or A=magenta and B=green is satisfied, display of four colors of white, black, A's color and B's color becomes possible.

Referring to FIG. 2, the polarizers 16A and 16B are disposed to have their polarization axes intersecting each other, and the intersecting polarization axes may preferably be disposed to provide a dark state in an erasure phase which will be explained hereinafter.

The electrode matrix shown in FIG. 1 may be driven according to a driving method as will be described hereinbelow.

In the present invention, a scanning selection signal is sequentially applied to the scanning electrodes two or more scanning electrodes apart or every third or more electrode so as to effectively suppress the occurrence of flickering in scanning drive at a low frame frequency. Particularly, by selecting every fourth or more scanning electrode in a field so that adjacent scanning electrodes are not selected in at least two consecutive fields, the occurrence of flickering can be suppressed in scanning drive at an even lower frequency. Some embodiments of this mode will be explained with reference to FIGS. 4 and 15–17.

Figure 4C:
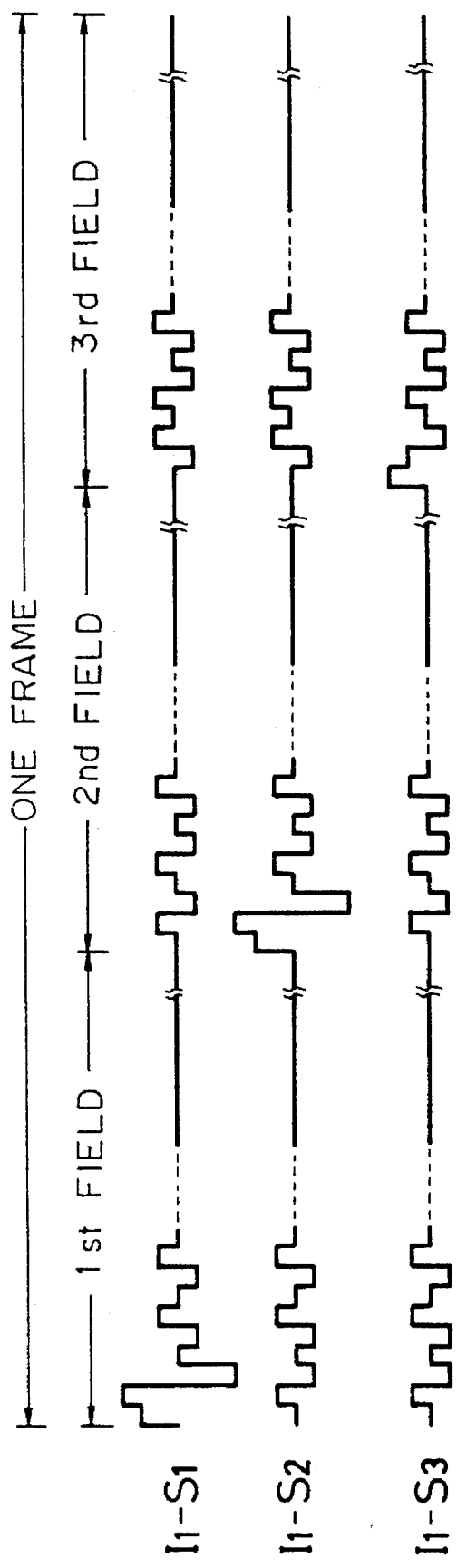

FIGS. 4A–4E show driving waveforms used in the present invention. More specifically, FIG. 4A shows a scanning selection signal $S_S$, a scanning non-selection signal $S_N$, a white data signal $I_W$ and a black data signal $I_B$. When a pixel on a selected scanning electrode to which a scanning selection signal is applied is supplied with a white data signal $I_W$ through a data electrode, the pixel is erased into a dark state (black) in phase $T_1$ as a result of application of a voltage $V_2$ at phase $t_1$ and a voltage $V_2+V_3$ at phase $t_2$, and is then written in ai bright state (white) at a subsequent phase $t_3$ by application of a voltage $-(V_1+V_3)$. On the other hand, when a pixel on the selected scanning electrode is supplied with a black data signal $I_B$ through a data electrode, the pixel is erased into a black state in phase $T_1$ as a result of application of $V_2$ at phase $t_1$ and $V_2-V_3$ at phase $t_2$, and the black state is retained after application of $V_3-V_1$, whereby the pixel is written in the black state.

Figure 5:
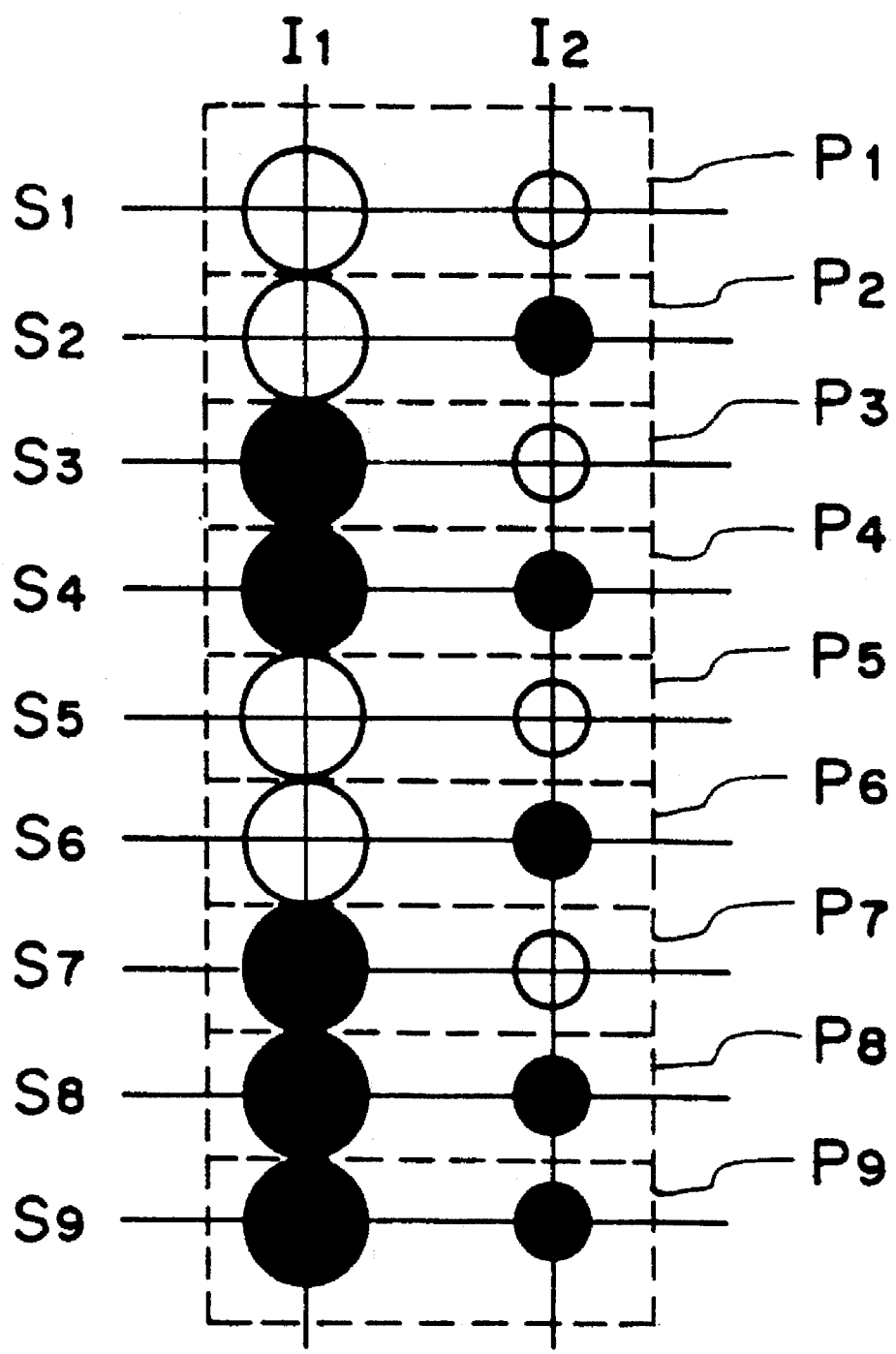
FIG. 5 is a schematic illustration of a display state of a matrix electrode structure.

In this embodiment, the above-mentioned scanning selection signal is applied to the scanning electrodes according to interlaced scanning of two or more scanning electrodes apart. FIG. 4B shows an example where the scanning selection signal is applied two scanning electrodes apart, i.e., every third scanning electrode. FIG. 4C shows an example set of driving waveforms whereby a display state shown in FIG. 5 is obtained. In FIG. 5, ● denotes a black written state and ○ denotes a white written state. In the example shown in FIG. 5, each intersection of scanning electrodes $S_1$–$S_9$ and a data electrode $I_1$ is set to have an area (pixel area) which is twice that of each intersection of the scanning electrodes $S_1$–$S_9$ and a data electrode $I_2$ to form pixels $P_1$–$P_9$. As described above, the pixels $P_1$–$P_4$ display four gradation levels due to differences in proportions of black and white states.

In the above example, scanning electrodes have been selected by interlaced scanning of two scanning electrodes apart. In addition to the above, however, selection or interlaced scanning of scanning electrodes can be effected three, four, . . . or N electrodes apart.

When the selection is effected N lines apart, one frame scanning may include N+1 fields of scanning. In the present invention, an interlaced scanning system of 8 or more lines apart may be effective for suppressing the flickering.

Figure 4D:
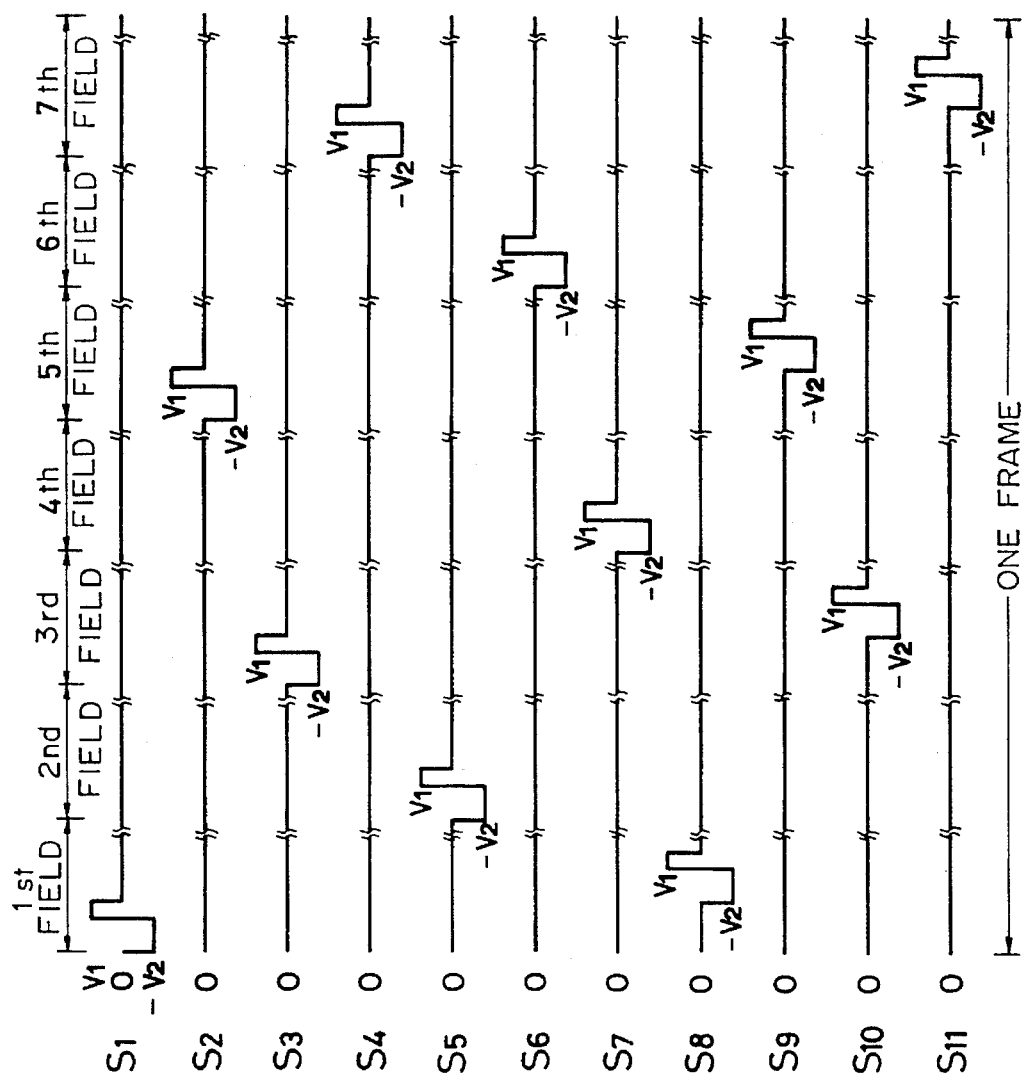
Figure 4E:
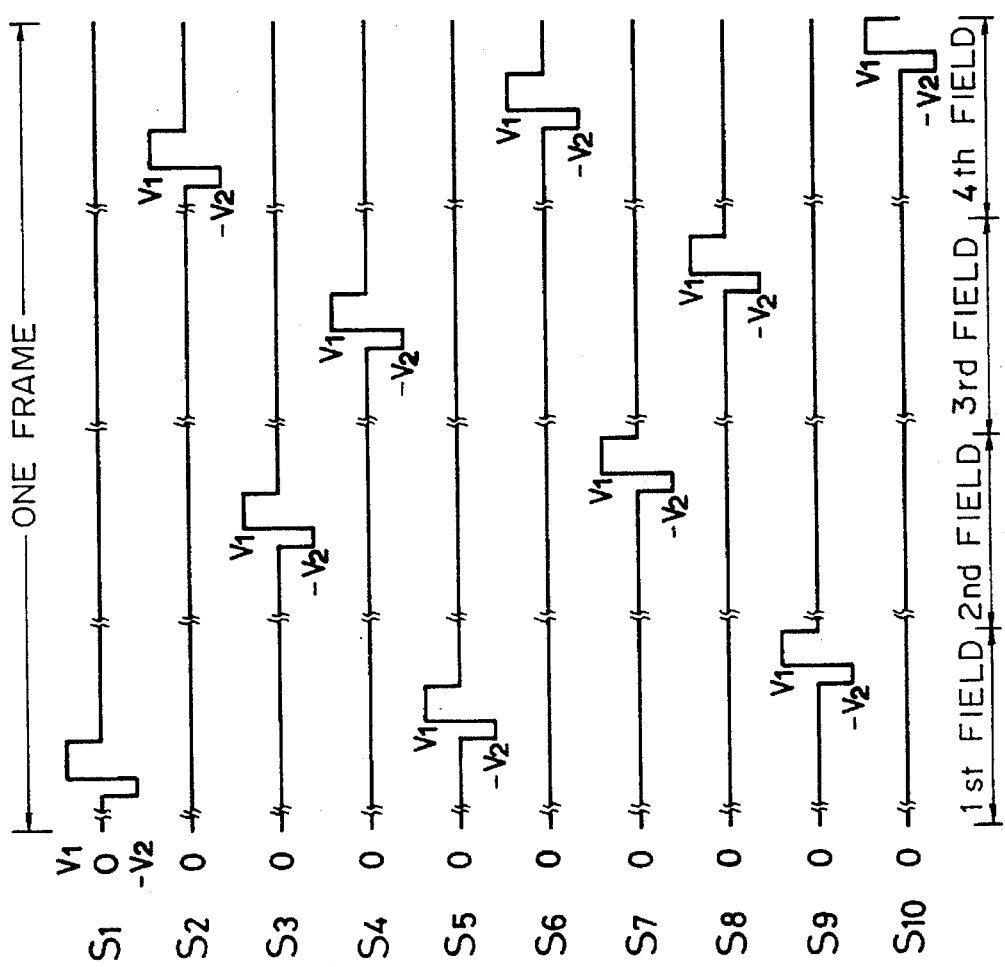

Further preferred embodiments are shown in FIGS. 4D and 4E. In an embodiment shown in FIG. 4D, a scanning selection signal is applied to the scanning electrodes 6 scanning electrodes apart (the number of scanning fields F=7), so that the scanning selection signal is applied to the 1st (F+1-th . . .), 5th (F+5-th . . .), 3rd (F+3-th . . .), 7th (F+7-th . . .), 2nd (F+2-th . . .), 6th (F+6-th . . .) and 4th (F+4-th . . .) scanning electrodes in the 1st, 2nd, . . . , and 7th fields, respectively. Thus, the order of scanning electrodes to which the scanning selection signal is applied sequentially does not correspond to the order of field. In other words, in the driving scheme shown in FIG. 4D, between any consecutive two of the seven fields constituting one frame (picture) scanning, the scanning selection signal is applied to scanning electrodes which are not adjacent to each other.

FIG. 4E shows another embodiment of the above scheme (interlaced scanning of 3 lines apart). The driving scheme adopted in the embodiments of FIGS. 4D and 4E is more effective in suppressing the occurrence of flickering than is the scanning signal application scheme shown in FIG. 4B.

FIGS. 6–14 show interlaced scanning schemes wherein a scanning selection signal is selectively applied to every other scanning electrode.

FIGS. 6A and 6B show a set of driving waveforms used in the present invention. More specifically, FIG. 6A shows a scanning selection signal $S_{4n-3}$ (n=1, 2, 3, . . .) applied to a (4n-3)th scanning electrode, a scanning selection signal $S_{4n-2}$ applied to a $(4_{n-2})$th scanning electrode, a scanning selection signal $S_{4n-1}$ applied to a (4n-1)th scanning electrode and a scanning selection signal applied to a 4n-th scanning electrode which are respectively applied in a (4M-3)th field $F_{4M-3}$, a (4M-2)th field $F_{4M-2}$, a (4M-1)th field $F_{4M-1}$ and a 4Mth field $F_{4M}$ (M=1, 2, 3 . . .). Herein, one field means one vertical scanning operation or period. According to FIG. 6A, the scanning selection signal $S_{4n-3}$ has voltage polarities (with respect to the voltage level of a scanning non-selection signal) which are opposite to each other in the corresponding phases of the (4M−3)th field $F_{4M-3}$ and (4M−1)th field $F_{4M-1}$, while the scanning selection signal $S_{4n-3}$ is so composed as to effect no scanning i.e. so as to be a scanning non-selection signal, in the (4M−2)th field $F_{4M-2}$ or 4Mth field $F_{4M}$. The scanning selection signal $S_{4n-1}$ is similar, but the scanning selection signal $S_{4n-3}$ and $S_{4n-1}$ applied in one field period have different voltage waveforms and have mutually opposite voltage polarities in the corresponding phases.

Similarly, the scanning selection signal $S_{4n-2}$ has voltage polarities (with respect to the voltage level of the scanning non-selection signal) which are mutually opposite in the corresponding phases of the (4M−2)th field $F_{4M-2}$ and 4Mth field $F_{4M}$ and effects no scan in the (4M−3)th field $F_{4M-3}$ or (4M−1)th field $F_{4M-1}$. The scanning selection signal $S_{4n}$ is similar, but the scanning selection signals $S_{4n-2}$ and $S_{4n}$ applied in one field period have different voltage waveforms and have mutually opposite voltage polarities in the corresponding phases.

Further, in the driving waveform embodiment shown in FIGS. 6A and 6B, a third phase is disposed for providing a pause to the whole picture (e.g., by applying a voltage of 0 simultaneously to all the pixels constituting the picture), and for this purpose, the scanning selection signals are set to have a voltage of zero (the same voltage level as the scanning non-selection signal).

Referring to FIG. 6B, data signals applied to data electrodes in the (4M−3)th field $F_{4M-3}$ comprise a white signal (one for providing a voltage $3V_0$ exceeding a threshold voltage of the FLC at the second phase in combination with the scanning selection signal $S_{4n-3}$ to form a white pixel) and a hold signal (one for applying to a pixel a voltage $\pm V_0$ below the threshold voltage of the FLC in combination with the scanning selection signal $S_{4n-3}$) which are selectively applied in synchronism with the scanning selection signal $S_{4n-3}$; and a black signal (for providing a voltage $-3V_0$ exceeding a threshold voltage of the FLC at the second phase in combination with the scanning selection signal $S_{4n-1}$ to form a black pixel) and a hold signal (for applying to a pixel a voltage $\pm V_0$ below the threshold voltage of the ferroelectric liquid crystal in combination with the scanning selection signal $S_{4n-1}$) which are selectively applied in synchronism with the scanning selection signal $S_{4n-1}$. On the contrary, the (4n−2)th scanning electrode and (4n)th scanning electrode are supplied with a scanning non-selection signal, so that the pixels on these scanning electrodes are supplied with the data signals as they are.

In the (4M−2)th field $F_{4M-2}$ subsequent to the writing in the above-mentioned (4M−3)th field $F_{4M-3}$, data signals applied to the data electrodes comprise the above-mentioned white signal and hold signal which are selectively applied in synchronism with the scanning selection signal $S_{4n-2}$; and the above-mentioned black signal and hold signal which are selectively applied in synchronism with the scanning selection signal $S_{4n}$. On the other hand, the (4n−3)th and (4n−1)th scanning electrodes are supplied with a scanning non-selection signal so that the data signals are applied as they are to the pixels on these scanning electrodes.

In the (4M−1)th field $F_{4M-1}$ subsequent to the writing in the above-mentioned (4M−2)th field $F_{4M-2}$, data signals applied to the data electrodes comprise the above-mentioned white signal and hold signal which are selectively applied in synchronism with the scanning selection signal $S_{4n-3}$; and the above-mentioned white signal and hold signal which are selectively applied in synchronism with the scanning selection signal $S_{4n-1}$. On the other hand, the (4n−2)th and (4n)th scanning electrodes are supplied with a scanning non-selection signal so that the data signals are applied as they are to the pixels on these scanning electrodes.

In the 4Mth field $F_{4M}$ subsequent to the writing in the above-mentioned (4M−1)th field $F_{4M-1}$, data signals applied to the data electrodes comprise the above-mentioned black signal and hold signal which are selectively applied in synchronism with the scanning selection signal $S_{4n-2}$; and the above-mentioned white signal and hold signal which are selectively applied in synchronism with the scanning selection signal $S_{4n}$. On the other hand, the (4n−3)th and (4n−1)th scanning electrodes are supplied with a scanning non-selection signal so that the data signals are applied as they are to the pixels on these scanning electrodes.

Figure 7A:
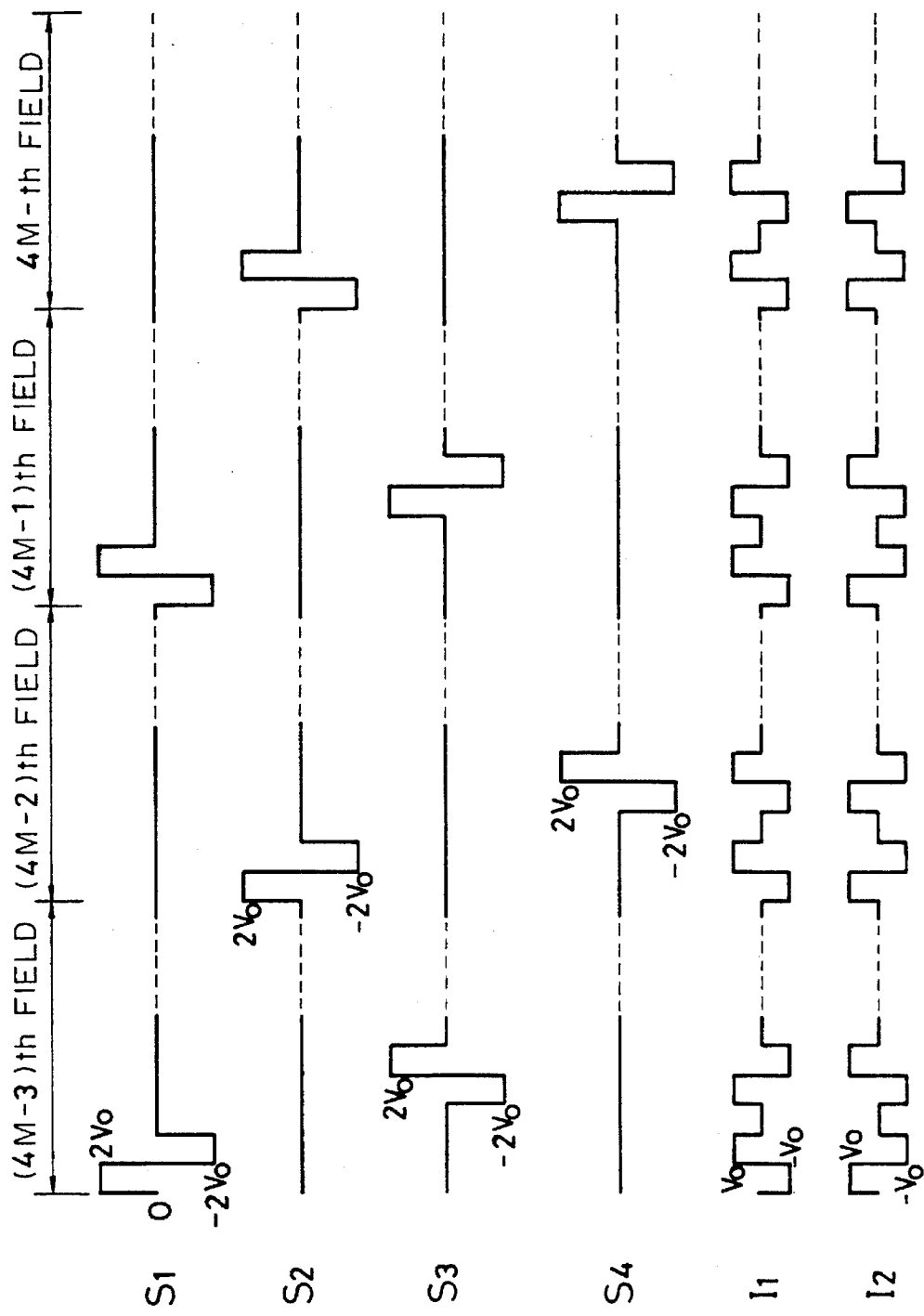
FIGS. 7A–7C are time charts showing successions of the driving waveforms.
Figure 7B:
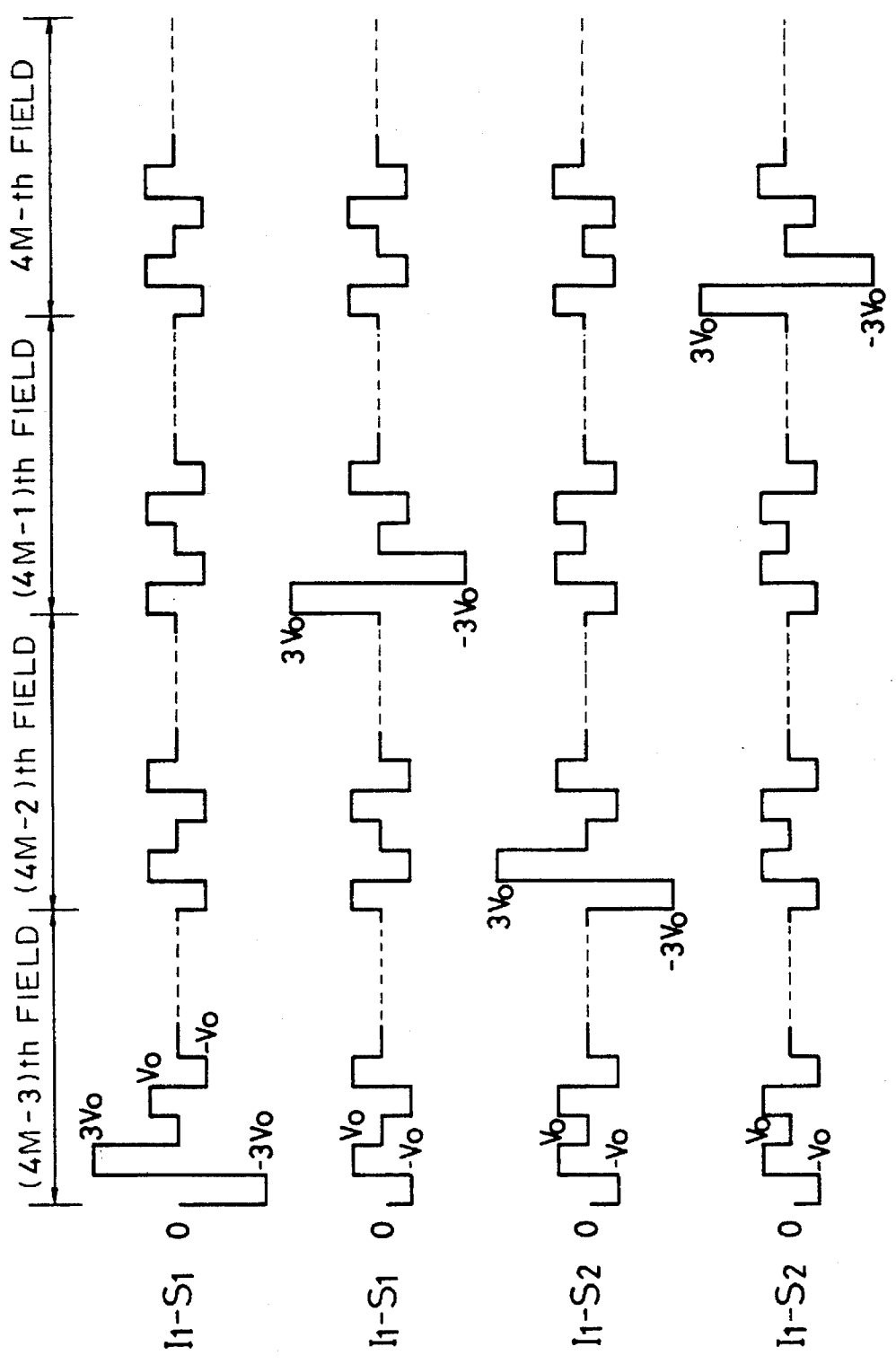
Figure 7C:
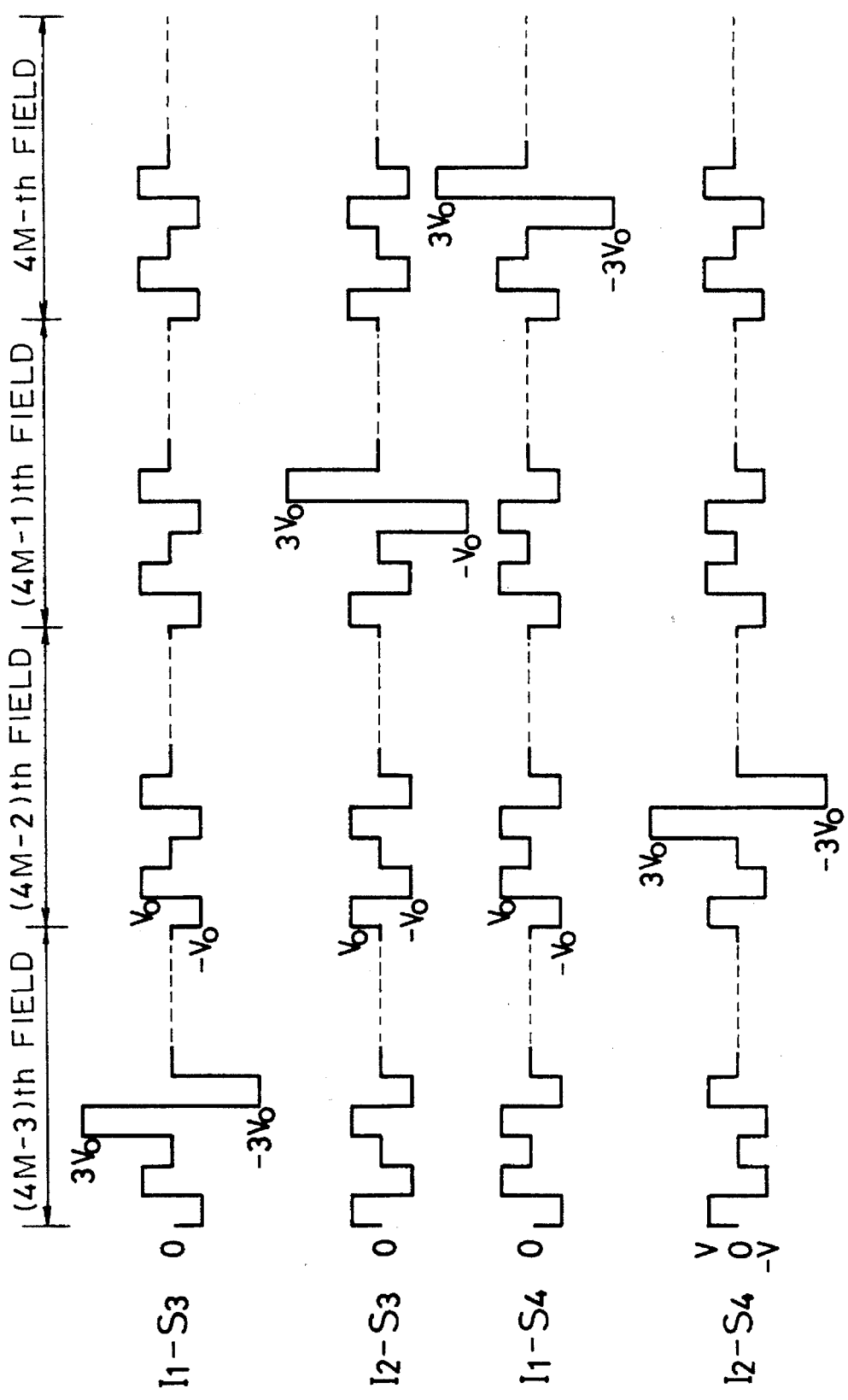
Figure 12:
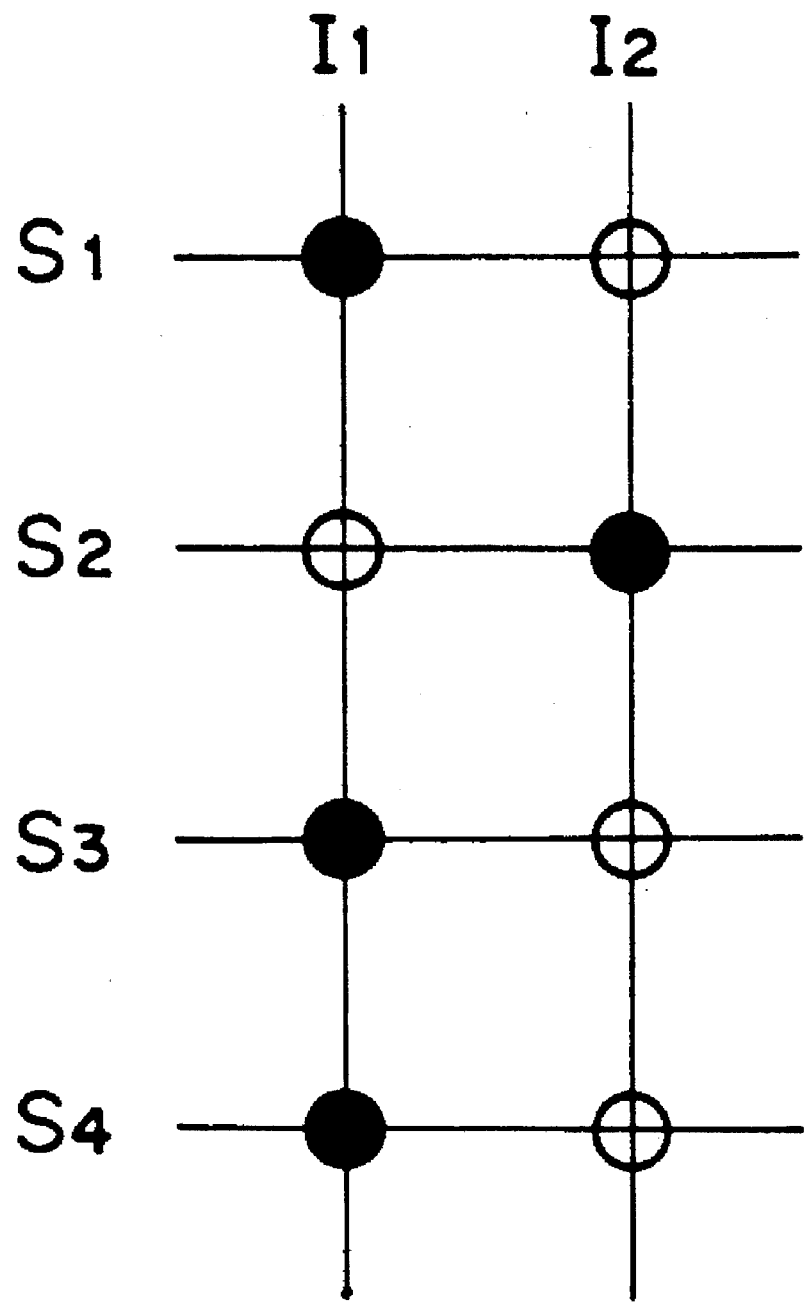
FIG. 12 is an illustration of a display state on an electrode matrix.

FIGS. 7A, 7B and 7C are time charts showing successions of driving waveforms shown in FIGS. 6A and 6B used for writing to form a display state shown in FIG. 12. In FIG. 12, ○ denotes a pixel written in white and ● denotes a pixel written in black. Further, referring to FIG. 7B, at $I_1-S_1$ is shown a time-serial voltage waveform applied to the intersection of a scanning electrode $S_1$ and a data electrode $I_1$. At $I_2-S_1$ is shown a time-serial waveform applied to the intersection of the scanning electrode $S_1$ and a data electrode $I_2$. Similarly, at $I_1-S_2$ is shown a time-serial voltage waveform applied to the intersection of a scanning electrode $S_2$ and the data electrode $I_1$; and at $I_2-S_2$ is shown a time-serial voltage waveform applied to the intersection of the scanning electrode $S_2$ and the data electrode $I_2$.

A gradational display may be effected by applying the embodiment of FIGS. 6A and 6B as well as one shown in FIGS. 8A and 8B explained hereinbelow to an electrode matrix as shown in FIG. 1.

Figure 9A:
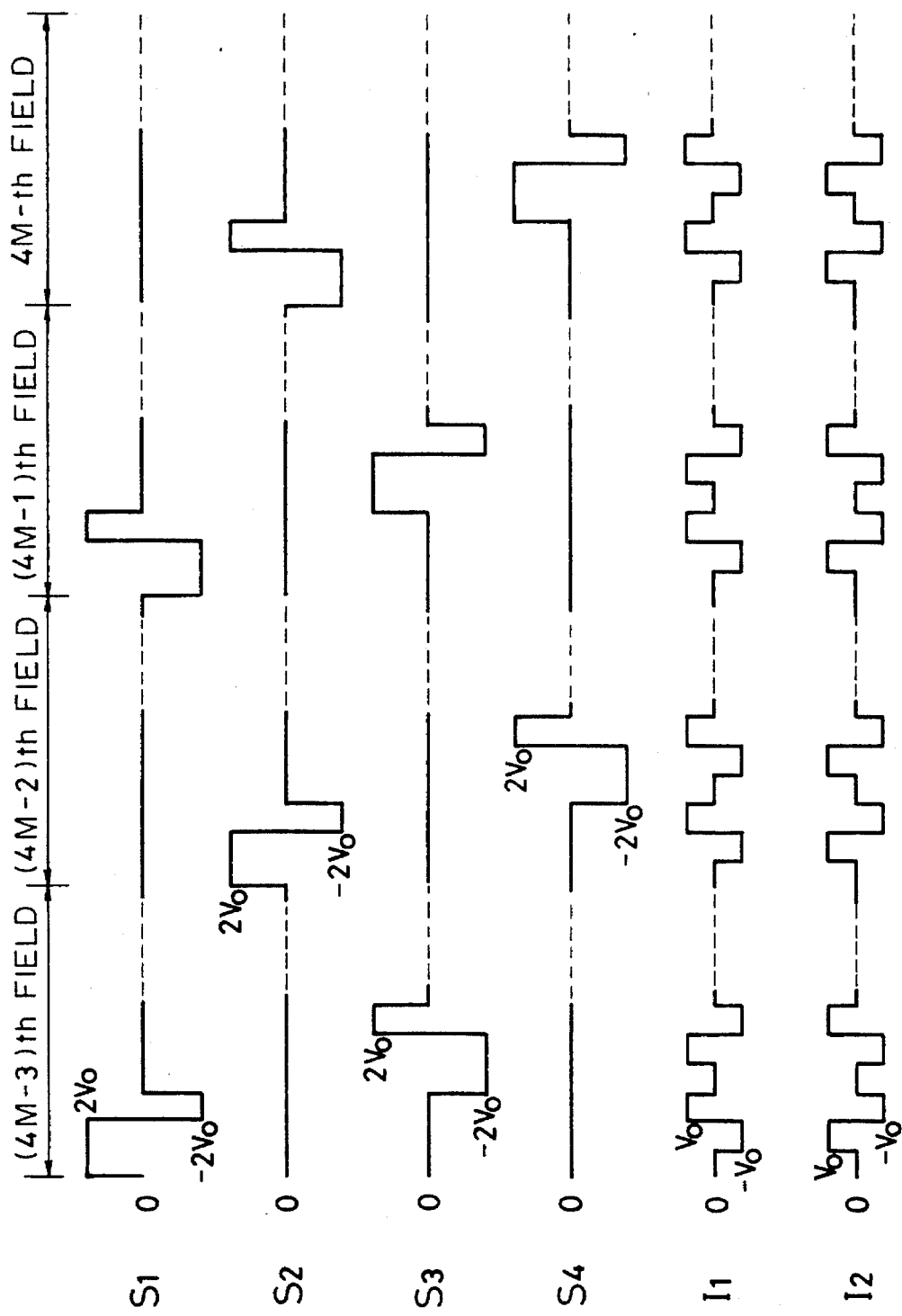
FIGS. 9A–9C are time charts showing successions of the driving waveforms.
Figure 9B:
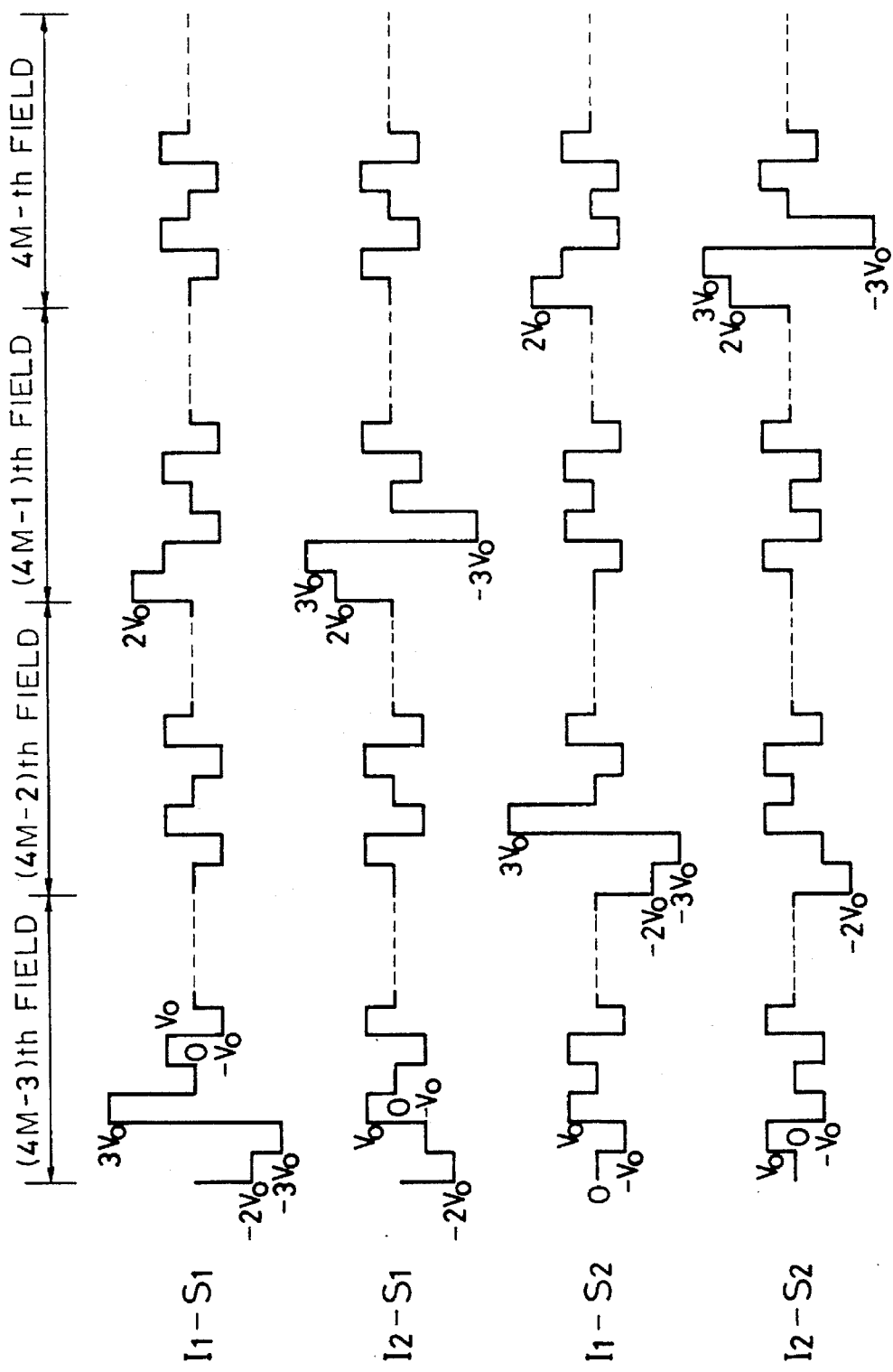
Figure 9C:
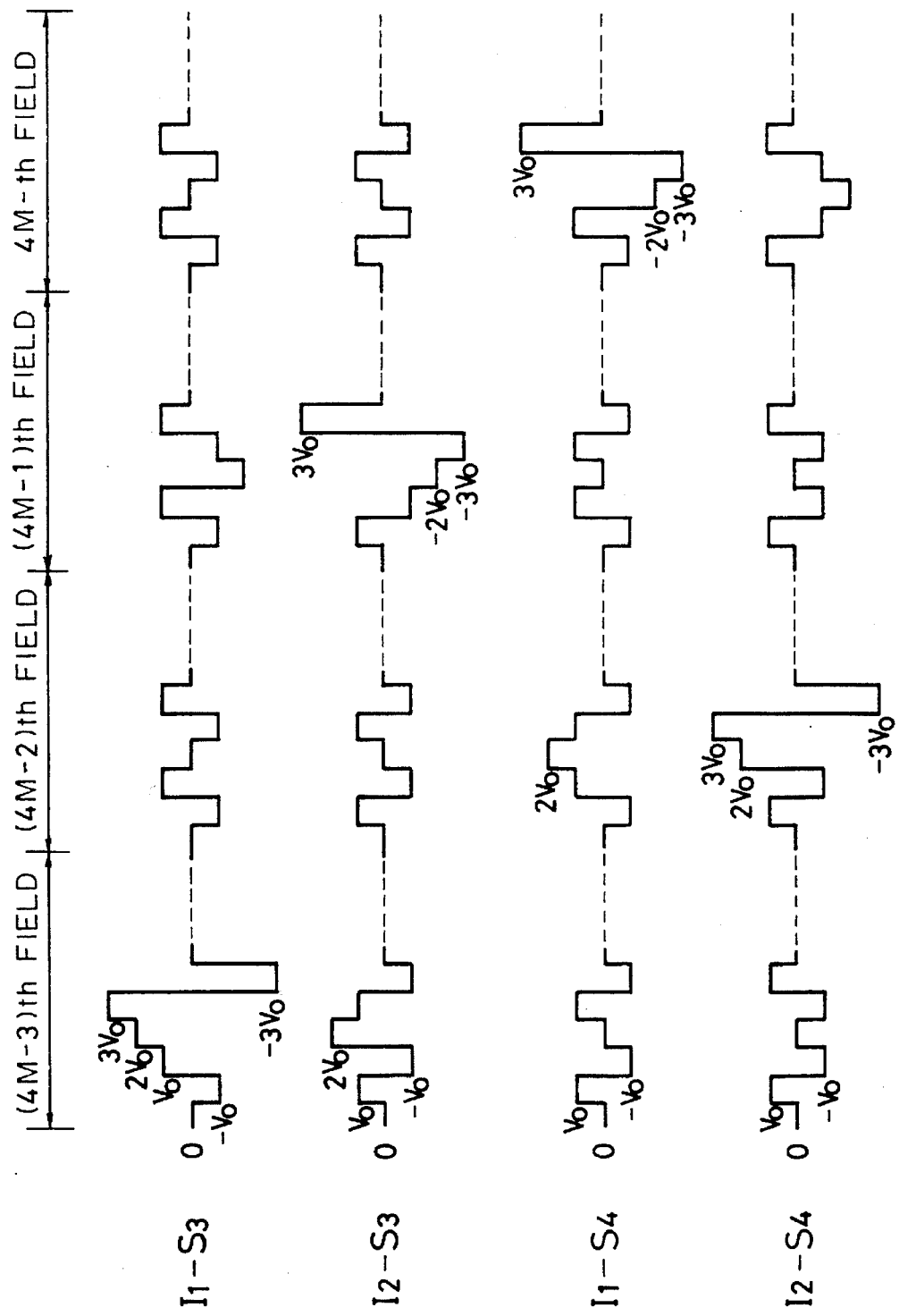

FIGS. 8A and 8B show another set of driving waveforms used in the present invention. In the driving embodiment shown in FIGS. 8A and 8B, each of the scanning selection signals $S_{4n-3}$ and $S_{4n-1}$ comprises two voltage waveforms which are of mutually opposite polarities with respect to the voltage level of a scanning non-selection signal, and each of the scanning selection signals comprises a former pulse and a latter pulse, the former having a duration twice that of the latter. Further, each data signal is characterized by having a voltage of zero at the first phase and alternating voltages at the first and third phases which are of mutually opposite polarities with respect to the scanning non-selection signal voltage. FIGS. 9A–9C are time charts showing successions of driving waveforms shown in FIGS. 8A and 8B used for writing to form the display state shown in FIG. 12.

Figure 10B:
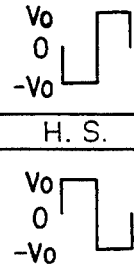
Figure 11B:
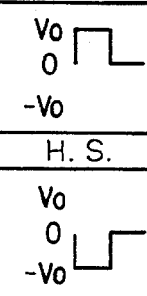

FIGS. 10 (10A and 10B) and 11 (11A and 11B) respectively show another preferred set of driving waveforms used in the present invention. In the embodiments shown in FIGS. 10 and 11, the scanning selection signals and the data signals are designed to have two voltage levels so that designing of a driving circuit therefor is simplified.

In the above driving embodiments, the amplitude of a scanning selection signal is set to $2|\pm V_0|$, while the amplitude of a data signal is set to $|\pm V_0|$. In the present invention, however, when the amplitude of a scanning selection signal is denoted by |Sap| and the amplitude of a data signal is denoted by |Iap|, it is generally preferred to satisfy $|Iap|/|Sap| \leq 1$, particularly $|Iap|/|Sap| < 1/1.2$.

In the present invention, if an FLC has two threshold voltages $V_{th1}$ and $-V_{th2}$ ($V_{th1}$, $V_{th2} > 0$), the above-mentioned voltage $V_0$ may be set to satisfy the following relationships:

$V_0 < V_{th1} < 3V_0$, and $-3V_0 < -V_{th2} < -V_0$.

The following Table 1 shows a time relation of a white selection voltage $S_W$ for forming white selection pixels and a half-selection voltage H applied as that time in fields $F_1$, $F_2$, $F_3$, $F_4$, . . . .

TABLE 1

|  | $F_1$ | $F_2$ | $F_3$ | $F_4$ | . . . |
|---|---|---|---|---|---|
| Scanning line $S_1$ | $S_W$ |  | H |  |  |
| Scanning line $S_2$ |  | $S_W$ |  | H |  |
| Scanning line $S_3$ | H |  | $S_W$ |  |  |
| Scanning line $S_4$ |  | H |  | $S_W$ |  |

The following Table 2 shows another time relation for forming white selection pixels.

TABLE 2

|  | $F_1$ | $F_2$ | $F_3$ | $F_4$ | . . . |
|---|---|---|---|---|---|
| Scanning line $S_1$ | $S_W$ | H | $S_W$ | H |  |
| Scanning line $S_2$ | $S_W$ | H | $S_W$ | H |  |
| Scanning line $S_3$ | $S_W$ | H | $S_W$ | H |  |
| Scanning line $S_4$ | $S_W$ | H | $S_W$ | H |  |

According to Table 1 relating to the invention, in (4M−3)th fields $F_1$, $F_5$, . . . , a white selection voltage $S_W$ is applied to pixels (white selection pixels) on (4N−3)th scanning lines $S_1$, $S_5$, . . . , a half-selection voltage is applied to pixels (white selection pixels) on (4N−1)th scanning lines $S_3$, $S_7$, . . . , and the pixels on (4N−2)th and (4N)th scanning electrodes $S_2$, $S_4$, $S_6$, $S_8$, . . . are not scanned. On the contrary, according to Table 2, pixels (white selection pixels) on all the scanning lines are supplied with a white selection voltage in the odd-numbered fields $F_1$, $F_3$ . . . , and pixels (white selection pixels) on all the scanning lines are supplied with a half-selection voltage in the even-numbered fields. As a result, according to the driving embodiment following the Table 2, flickering occurs at a ½ field frequency (In the case of Table 2, the field frequency is equal to the frame frequency because all the scanning lines are scanned in one vertical scanning). This means that, if the frame frequency is taken as an ordinary value of 30 Hz, flickering occurs at 15 Hz. In contrast thereto, according to the method of Table 1, only a half of the total scanning lines are scanned in one vertical scanning period (one field) so that the field frequency (the reciprocal of one vertical scanning period) $f_1$ can be increased to twice the field frequency $f_2$ according to the method of Table 2 ($f_1=f_2$). As a result, the flickering occurs at a frequency which is four times that according to the method of Table 2. More specifically, in the case of an ordinary frequency of 30 Hz, the flickering occurs at a frequency of 60 Hz. Moreover, according to the method of Table 1, the number of pixels supplied with a half-selection voltage is reduced to ¼ of that according to the method of Table 2, whereby the flickering is effectively prevented by that much.

Further, according to a method using a time relation shown in Table 3 below, in an odd-numbered field, pixels (white selection pixels) on the odd-numbered scanning lines $S_1$, $S_3$, . . . are supplied with a white selection voltage and pixels (white selection pixels) on the even-numbered scanning lines $S_2$, $S_4$, . . . are supplied with a half-selection voltage so that flickering occurs at the field frequency (equal to the frame frequency because all the scanning lines are scanned in one vertical scanning according to Table 3).

TABLE 3

|  | $F_1$ | $F_2$ | $F_3$ | $F_4$ | . . . |
|---|---|---|---|---|---|
| Scanning line $S_1$ | $S_W$ | H | $S_W$ | H |  |
| Scanning line $S_2$ | H | $S_W$ | H | $S_W$ |  |
| Scanning line $S_3$ | $S_W$ | H | $S_W$ | H |  |
| Scanning line $S_4$ | H | $S_W$ | H | $S_W$ |  |

In contrast thereto, according to the method of Table 1 as described above, only a half of the total scanning lines are scanned in one vertical scanning period (one field) so that the field frequency $f_1$ can be increased to twice the field frequency $f_3$ according to the method of Table 3 ($f_1=f_3$). As a result, the flickering occurs at a frequency which is twice that according to the method of Table 3. Thus, in the case of an ordinary frequency of 30 Hz, the flickering occurs at a frequency of 60 Hz. Moreover, according to the method of Table 1, the number of pixels supplied with a half-selection voltage is reduced to ½ of that according to the method of Table 3, whereby the flickering is effectively prevented by that much.

Figure 13B:
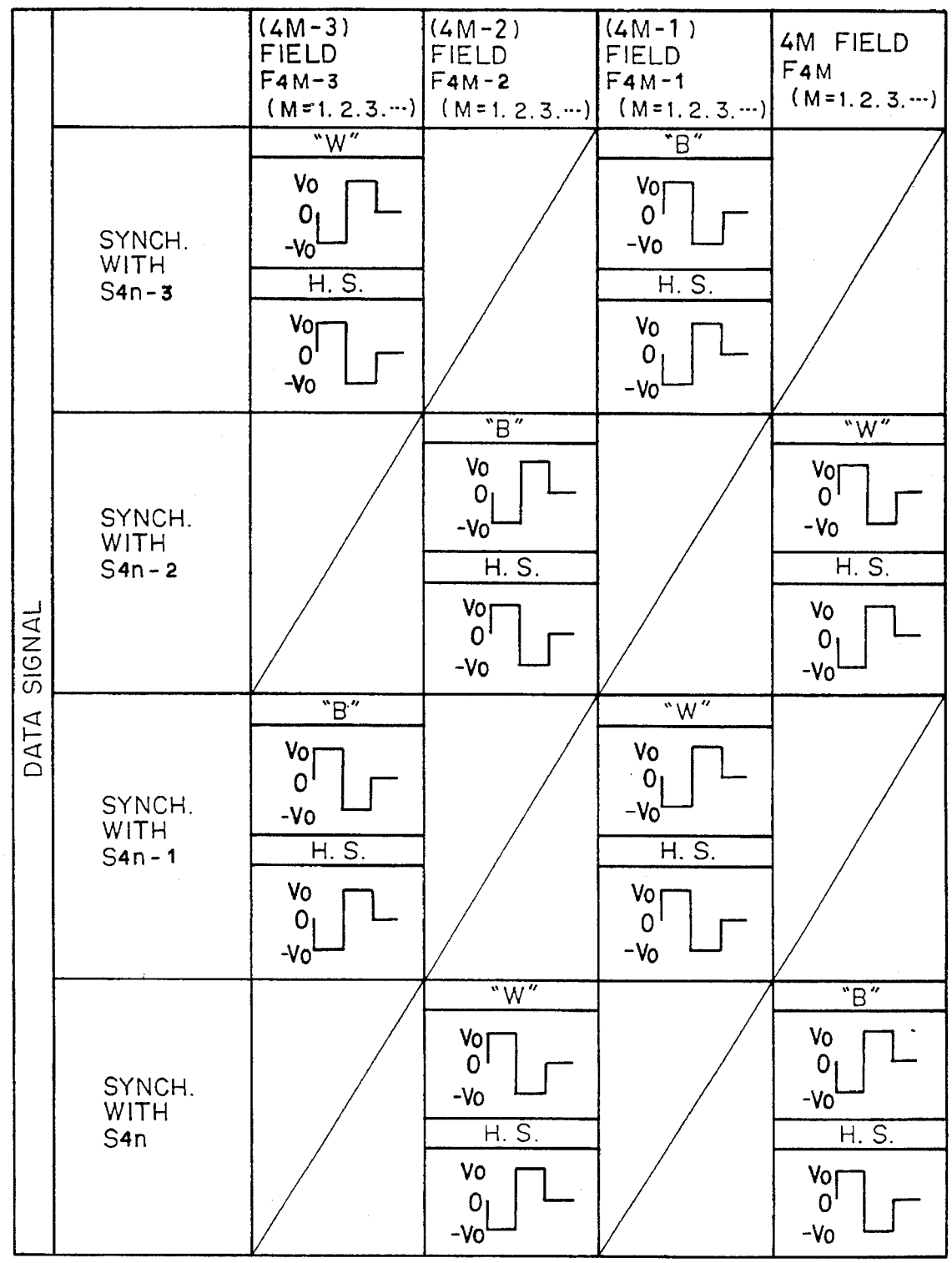

FIGS. 13A and 13B show still another set of driving waveforms used in the present invention.

In the driving embodiment shown in FIG. 6, the scanning selection signal $S_{4n-3}$ applied to the (4n−3)th scanning electrode (or the scanning selection signal $S_{4n-1}$ applied to the (4n−1)th scanning electrode) in the (4M−3)th field $F_{4M-3}$ and the scanning selection signal $S_{4n-2}$ applied to the (4n−1)th scanning electrode (or the scanning selection signal $S_{4n}$ applied to the 4n-th scanning electrode) in the (4M−2)th field $F_{4M-2}$ are the same. In contrast thereto, in the driving embodiment shown in FIG. 13 (13A and 13B), $S_{4n-3}$ (or $S_{4n-1}$) in $F_{4M-3}$ and $S_{4n-2}$ (or $S_{4n}$) in $F_{4M-2}$ have mutually different voltage waveforms and have mutually opposite voltage polarities in the corresponding phases.

The following Table 4 shows a time relation of a white selection voltage $S_W$ for forming white selection pixels and a half-selection voltage H applied at that time in fields $F_1$, $F_2$, $F_3$, $F_4$ . . . according to the driving embodiment shown in FIG. 13.

TABLE 4

|  | $F_1$ | $F_2$ | $F_3$ | $F_4$ | . . . |
|---|---|---|---|---|---|
| Scanning line $S_1$ | $S_W$ |  | H |  |  |
| Scanning line $S_2$ |  | H |  | $S_W$ |  |
| Scanning line $S_3$ | H |  | $S_W$ |  |  |
| Scanning line $S_4$ |  | $S_W$ |  | H |  |

As is apparent from a comparison between Table 1 and 4, the driving embodiment of FIG. 13 is effective for preventing flickering similarly as the embodiment shown in FIG. 6 except that the time relation between the application of a white-selection voltage $S_W$ and that of a half-section voltage in fields $F_1$, $F_2$, $F_3$, $F_4$, . . . is different from that shown in FIG. 6. Thus, the present invention is not limited to a particular time relation according to which a selection voltage and a half-selection voltage are applied in each field.

Figure 14B:
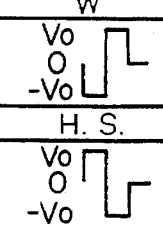

FIGS. 14A and 14B show a further set of driving waveforms used in the present invention. In the embodiment shown in FIG. 6 (or FIG. 13), the time for applying a selection voltage is shifted to a next (or preceding) scanning line for each field as is understood from Table 1 (or Table 4). More specifically, if it is assumed that a scanning line Sn is selected in an n-th field, a scanning line $S_{n+1}$ (or $S_{n-1}$) is selected in an (n+1)th field and a scanning line $S_{n+2}$ (or $S_{n-2}$) is selected in an (n+2)th field. In this way, the time for applying a selection voltage is shifted sequentially for each field. For this reason, in case where a contrast (brightness difference) is present between a selection time and a half-selection time, the contrast occurs at the time of applying a selection voltage to a scanning line and is sequentially moved on a screen like a line flow to result in a remarkable degradation in display quality.

Table 5 below shows a time relation for application of a white selection voltage $S_w$ and a half-selection voltage H at that time applied to pixels in fields $F_1$, $F_2$, $F_3$, $F_4$, . . . by using the driving embodiment shown in FIG. 14 (14A and 14B).

|  | $F_1$ | $F_2$ | $F_3$ | $F_4$ | $F_5$ | $F_6$ | $F_7$ |
|---|---|---|---|---|---|---|---|
| Scanning line $S_1$ | $S_W$ |  | H |  | H |  | $S_W$ |
| Scanning line $S_2$ |  | $S_W$ |  | H |  | $S_W$ |  |
| Scanning line $S_3$ | H |  | $S_W$ |  | $S_W$ |  | H |
| Scanning line $S_4$ |  | H |  | $S_W$ |  | H |  |
| Scanning line $S_5$ | $S_W$ |  | H |  | H |  | $S_W$ |
| Scanning line $S_6$ |  | $S_W$ |  | H |  | $S_W$ |  |
| Scanning line $S_7$ | H |  | $S_W$ |  | $S_W$ |  | H |
| Scanning line $S_8$ |  | H |  | $S_W$ |  | H |  |

The driving embodiment shown in FIGS. 14A and 14B has been designed to remove a problem caused accompanying a time relation of applying selection voltages. Thus, as will be apparent from the above Table 5, the sequential movement of a point of applying a selection voltage in one direction is prevented to the utmost while avoiding degradation in display quality.

Thus, the present invention also provides a solution to a problem caused by a time relation of applying a selection voltage and a half-selection voltage in each field.

Figures 3, 15B:
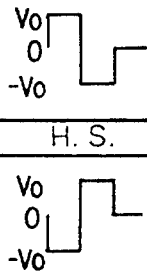
Figures 4, 15B:
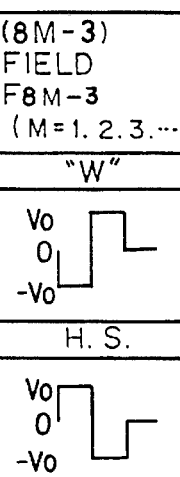

FIGS. 15A and 15B show still another driving embodiment of the present invention. In the embodiment of FIG. 6, the number of scanning lines scanned in one vertical scanning period is ½ of the total scanning lines and all the scanning lines are scanned in two times of vertical scanning. In the embodiment of FIGS. 15A and 15B, every fourth scanning line is scanned in one vertical scanning period, and a scanning line next to the one scanned in the previous vertical scanning period is scanned in the next vertical scanning period. Accordingly, the number of scanning lines scanned in one vertical scanning period is ¼ of the total scanning lines, so that all the scanning lines are scanned in four times of vertical scanning.

Table 6 below shows a time relation for application of a white selection voltage $S_W$ and a half-selection voltage H applied to pixels in fields $F_1$, $F_2$, $F_3$, $F_4$, . . . by using the driving embodiment shown in FIG. 15 (15A and 15B).

TABLE 6

|  | $F_1$ | $F_2$ | $F_3$ | $F_4$ | $F_5$ | $F_6$ | $F_7$ | $F_8$ | . . . |
|---|---|---|---|---|---|---|---|---|---|
| Scanning line $S_1$ | $S_W$ |  |  |  | H |  |  |  |  |
| Scanning line $S_2$ |  | $S_W$ |  |  |  | H |  |  |  |
| Scanning line $S_3$ |  |  | $S_W$ |  |  |  | H |  |  |
| Scanning line $S_4$ |  |  |  | $S_W$ |  |  |  | H |  |
| Scanning line $S_5$ | H |  |  |  | $S_W$ |  |  |  |  |
| Scanning line $S_6$ |  | H |  |  |  | $S_W$ |  |  |  |
| Scanning line $S_7$ |  |  | H |  |  |  | $S_W$ |  |  |
| Scanning line $S_8$ |  |  |  | H |  |  |  | $S_W$ |  |

As is shown in Table 6 in comparison with Table 1, in (8M−7)th fields $F_1$, $F_9$, . . . in the embodiment of FIG. 15, pixels (white selection pixels) on (8M−7)th scanning lines $S_1$, $S_9$, . . . are supplied with a white selection voltage; pixels (white selection pixels) on (8M−3)th scanning lines $S_5$, $S_{13}$, . . . are supplied with a half-selection voltage; and pixels on (8N−6)th, (8N−5)th, (8N−4)th, (8N−2)th, (8N−1)th and (8N)th scanning lines $S_2$, $S_3$, $S_4$, $S_6$, $S_7$, $S_8$ . . . are not scanned. As a result, in the driving embodiment of FIG. 15, only ¼ of the total scanning lines are scanned in one vertical scanning period (one field), so that the field frequency $f_{10}$ (the reciprocal of one vertical scanning period) becomes two times the field frequency $f_1$ according to Table 1 ($f_{10}=2f_1$). Thus, in the case of an ordinary frame frequency of 30 Hz, the flickering occurs at a frequency of 120 Hz. In this way, even if the number of scanning lines is increased for providing a larger screen, flickering can be effectively suppressed. Moreover, according to the embodiment of FIG. 15, the number of pixels supplied with a half-selection voltage is reduced to ½ of that according to the embodiment of Table 1 (FIG. 6), whereby the flickering is further effectively prevented.

As described above, in the present invention, all the scanning lines are not scanned in one time of vertical scanning but in several times of vertical scanning so as to prevent flickering. Thus, the number of vertical scanning required for vertical scanning is not particularly limited as far as it is at least two times.

Figures 1, 16B:
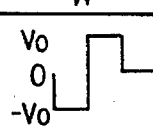

FIGS. 16A and 16B show still another driving embodiment of the present invention. In the embodiment shown in FIG. 15, (8N−7)th and (8N−3)th scanning lines are scanned in an (8M−7)th field, and (8N−6)th and (8N−2)th scanning lines are scanned in the subsequent (8M−6)th field. In other words, a scanning line next to the one scanned in a previous field is scanned in the next field, a further next scanning line is scanned in the subsequent field, and so on. In such a scanning method, as is apparent from Table 6, the time or point for applying a selection voltage is shifted sequentially for each field. As a result, in case where a contrast is present between a selection time and a half-selection time, the contrast occurs at the time of applying a selection voltage to a scanning line and is sequentially moved on a screen like a line flow to result in a remarkable degradation in display quality.

Figures 2, 16B:
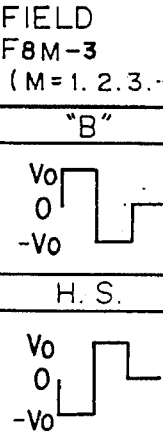
Figures 3, 16B:
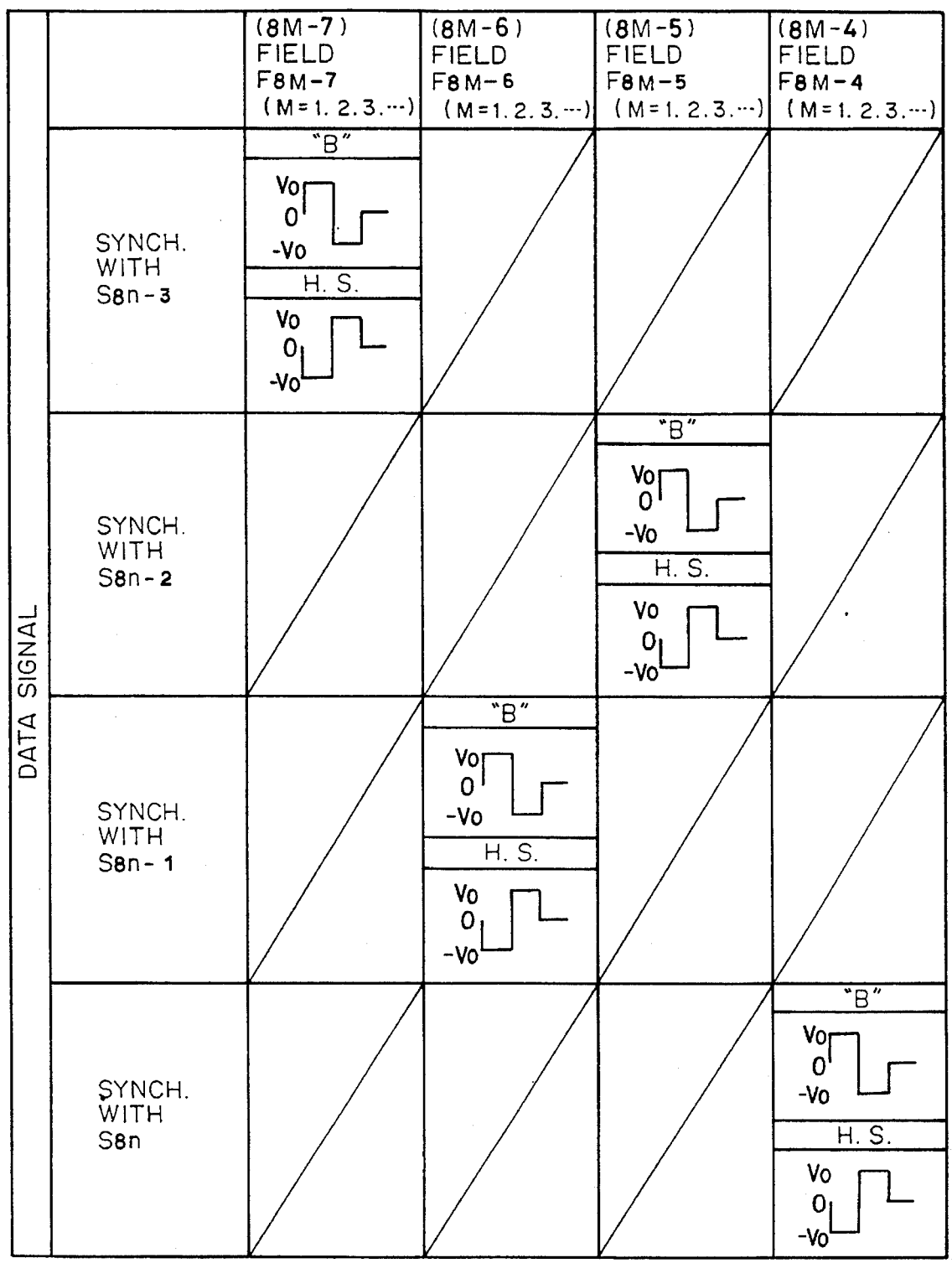
Figures 1, 17B:
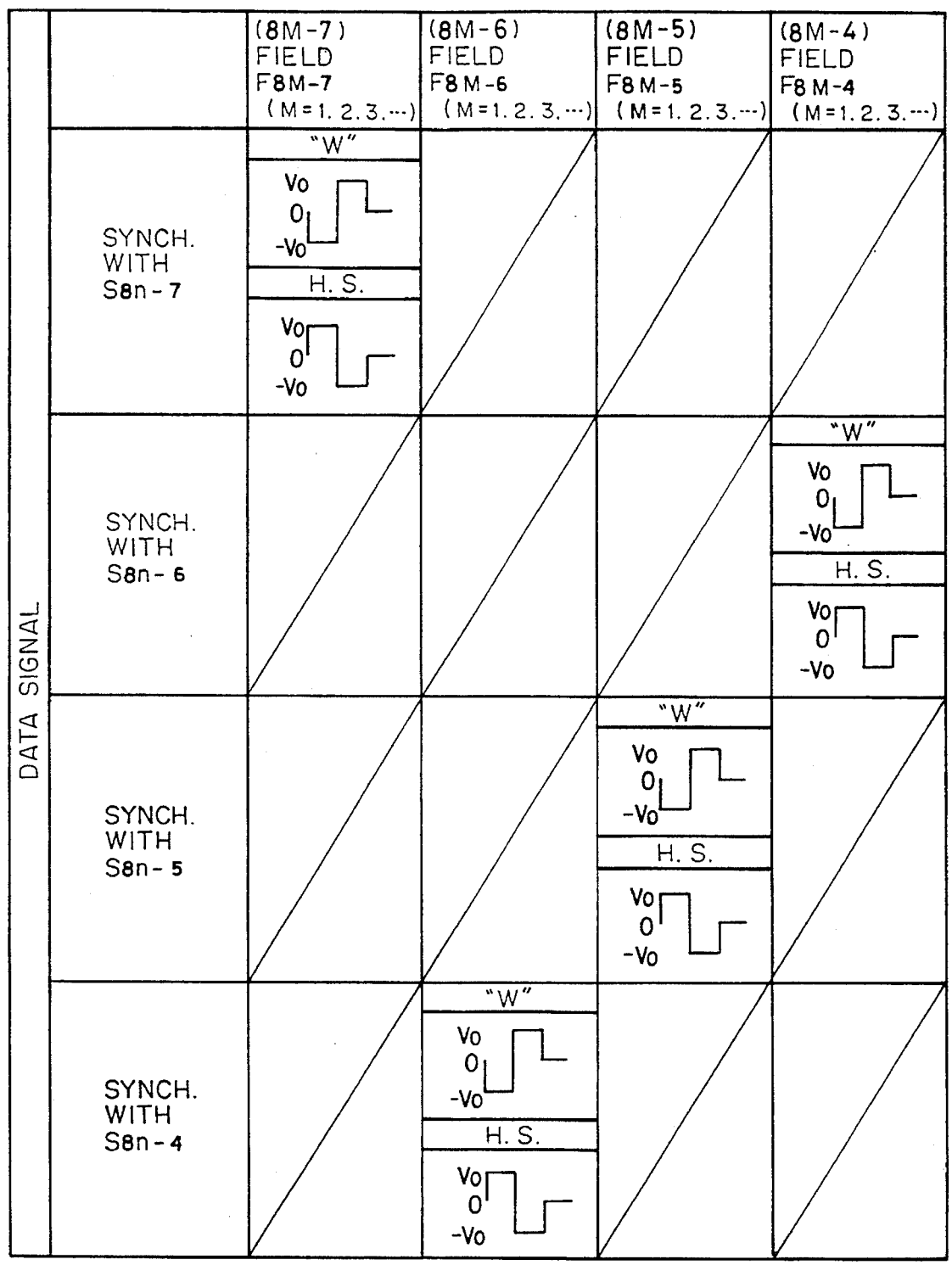
Figures 2, 17B:
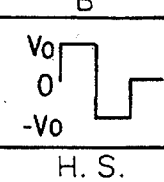
Figures 3, 17B:
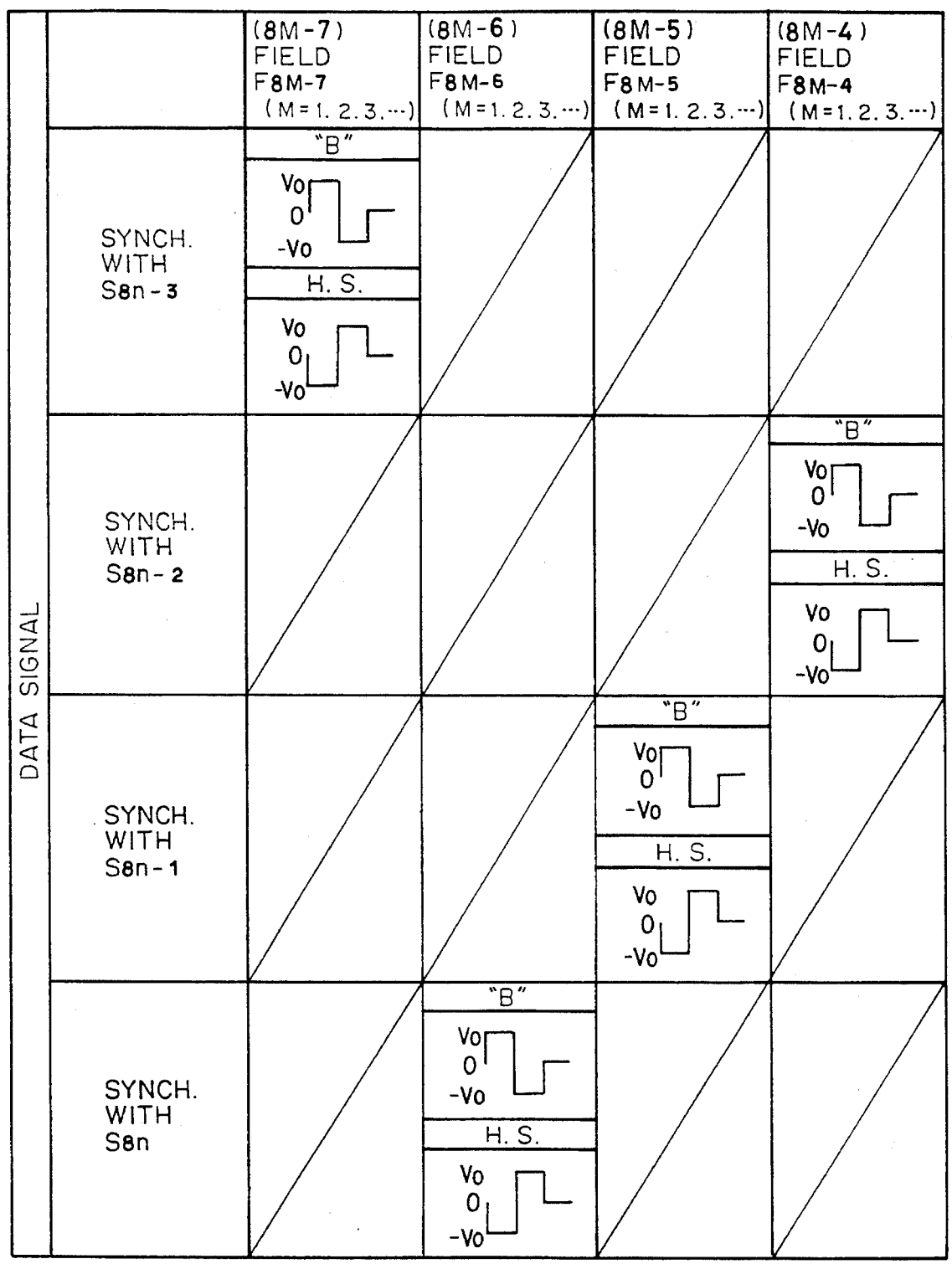
Figures 4, 17B:
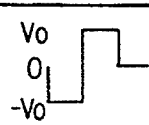

Table 7 below shows a time relation for application of a white selection voltage $S_W$ and a half-selection voltage H at that time applied to pixels in fields $F_1$, $F_2$, $F_3$, $F_4$, . . . by using the driving embodiment shown in FIG. 16 (16A and 16B).

TABLE 7

| | F$_1$ | F$_2$ | F$_3$ | F$_4$ | F$_5$ | F$_6$ | F$_7$ | F$_8$ | ... |
|---|---|---|---|---|---|---|---|---|---|
| Scanning line S$_1$ | S$_W$ | | | | H | | | | |
| Scanning line S$_2$ | | | S$_W$ | | | | H | | |
| Scanning line S$_3$ | | S$_W$ | | | | H | | | |
| Scanning line S$_4$ | | | | S$_W$ | | | | H | |
| Scanning line S$_5$ | H | | | | S$_W$ | | | | |
| Scanning line S$_6$ | | | H | | | | S$_W$ | | |
| Scanning line S$_7$ | | H | | | | S$_W$ | | | |
| Scanning line S$_8$ | | | | H | | | | S$_W$ | |

The driving embodiment shown in FIGS. 16A and 16B has been designed to remove a problem as described above accompanying a time relation of applying selection voltages. Thus, as will be apparent from the above Table 7, the sequential movement of a point of applying a selection voltage in one direction is prevented to the utmost while according degradation in display quality.

FIG. 17 (17A and 17B) shows still another preferred driving embodiment of the present invention. As shown in FIGS. 17A-1 and 17A-2, a scanning selection signal is applied to every fourth scanning electrode in a field, and the scanning electrodes selected in two consecutive fields are not adjacent to each other.

In the present invention, all the scanning lines are scanned in at least two times of vertical scanning to prevent the occurrence of flickering, and the order of scanning scanning lines is not limited. Further, in the present invention, in addition to the above embodiment, a scanning selection signal may also be applied plural (A) lines apart (A=2, 3, 5, . . . , 20), and the vertical scanning may be repeated (A+1) times.

In the present invention, in addition to the above-described driving waveforms, there may be used those unit driving waveforms utilized in multiplex driving systems as disclosed in U.S. Pat. Nos. 4,548,476; 4,655,561; 4,638,310; 4,705,345; "SID 85 Digest" (1985) p.p. 131–134 "An Application of Chiral Smectic-C Liquid Crystal to a Multiplexed Large-Area Display". Particularly, the above "SID 85 Digest" discloses the use of two bipolar voltages of mutually anti-phases, which has been found to accompany the following features.

FIG. 18A shows driving waveforms used in an odd-numbered frame, and FIG. 18B shows driving waveforms used in an even-numbered frame. Referring to FIG. 18A, at (a) is shown a scanning selection signal, at (b) is shown a scanning non-selection signal, and at (c) and (d) are shown data signals comprising two bipolar voltages of mutually anti-phases. In the odd-numbered frame, the data signal at (c) functions as a hold signal (H.S.), and the data signal at (d) functions as a white (or black) writing signal. In the even-numbered frame, the data signal at (c) functions as a black (or white) writing signal, and the data signal at (d) functions as a hold signal.

FIG. 19A shows a driving waveform applied to a certain noted pixel (formed at an intersection of a scanning electrode and a data electrode) the time of non-selection when supplied with "white (or black)"—"hold" signals, and FIG. 19B shows a driving waveform applied to such a pixel when supplied with "black (or white,"—"hold" signals. As shown in FIGS. 19A and 19B, when a unit pulse duration is denoted by ΔT, a certain noted pixel at the time of non-selection is supplied with a pulse component of 2ΔT duration.

Figure 20:
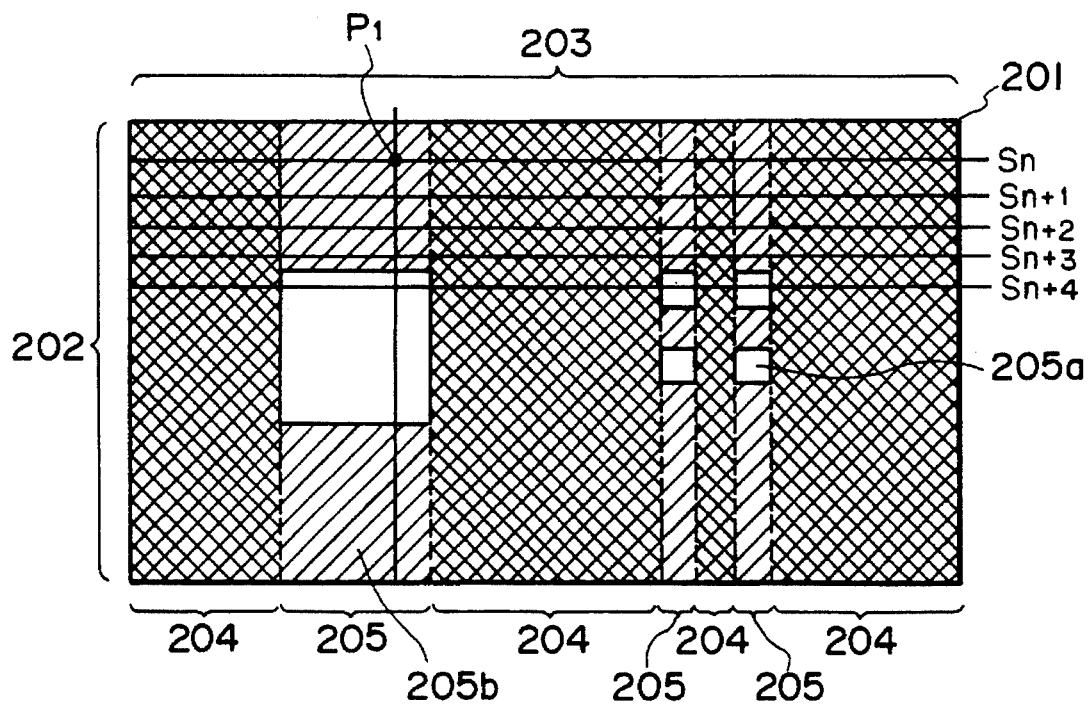
FIG. 20 is a schematic illustration of a display state of a display panel of the prior art.

A display of a white image on a black background was formed while applying a scanning selection signals periodically and repeatedly to the scanning electrodes. A display obtained at that time is schematically shown in FIG. 20. Referring to FIG. 20, a display panel 201 has a scanning electrode side 202 and a data electrode side 203, on the panel 201 are formed a black background, white image portions 205$a$ and pale black or gray background portions 205$b$. As is understood from such a display state of the display panel 201, gray or pale black background portions were formed at regions expected to form a part of the black background along the data electrodes providing the white image portions. Such a display state degrades the display quality and is not desirable.

Figure 21A:
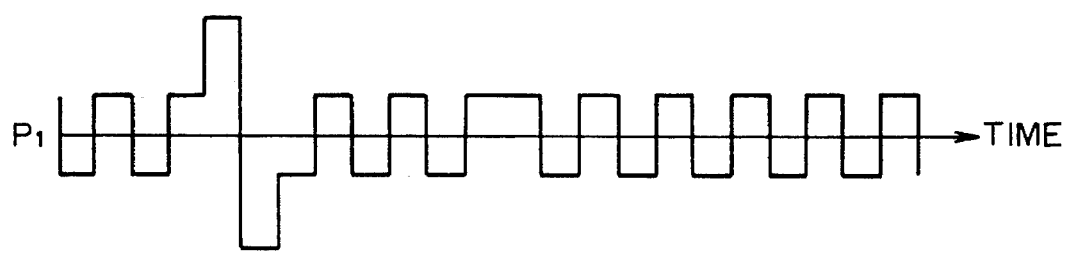
FIG. 21A is a test waveform diagram and FIG. 21B is a time chart showing an optical response obtained at that time.
Figure 21B:
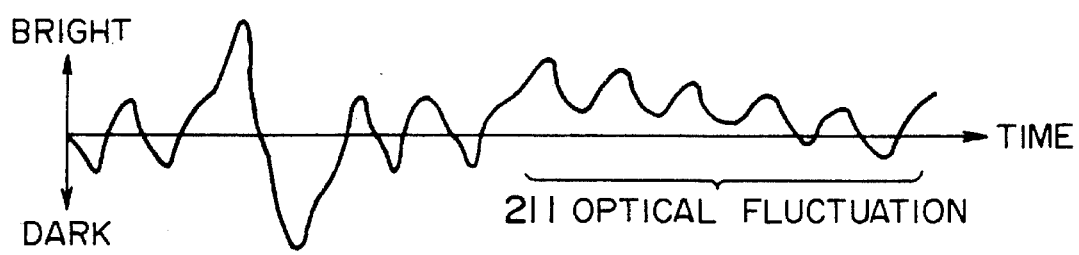

In order to find the cause of the above phenomena, a driving waveform shown in FIG. 21A was applied to an intersection P$_1$ of a scanning electrode S$_n$ and a data electrode I shown in FIG. 20. At this time, the data electrode I was supplied with data signals of B→B→B→B→W→W→W (B:black, W:white) in synchronism with the scanning signals applied to the scanning electrodes S$_n$, S$_{n+1}$, S$_{n+2}$, S$_{n+3}$, S$_{n+4}$, S$_{n+5}$ and S$_{n+6}$. FIG. 21B shows an optical response obtained at that time measured by a photomultiplier. As is understood from FIG. 21A, the intersection P$_1$ was supplied with a pulse with a duration of 2ΔT at the time of switching of data signals from B→W, which caused an optical fluctuation 211 as shown in FIG. 21B. Accordingly, such an optical "fluctuation" was caused based on occurrence of pale black background portions. The above phenomenon was remarkably observed particularly in a refresh drive scheme wherein a scanning selection signal was periodically applied.

According to the present invention, however, such an optical fluctuation has been effectively suppressed by using a liquid crystal apparatus comprising a) a liquid crystal device comprising an electrode matrix composed of scanning electrodes and data electrodes, and a ferroelectric liquid crystal; and b) a driving means including: a first means for selecting at least one scanning electrode and applying to the selected at least one scanning electrode a scanning selection signal which comprises a pulse of one polarity and a pulse of the other polarity with respect to the voltage level of a non-selected scanning electrode, said pulses of one and the other polarities having mutually different pulse durations, and a second means for applying data signals to the data electrode, each data signal comprising a pulse of one polarity and a pulse of the other polarity with respect to the voltage level of a non-selected scanning electrode, the pulses of one and the other polarities having mutually different pulse durations, a pulse having the largest pulse duration of the pulses being synchronized with the pulse at the last phase of the scanning selection signal.

FIGS. 22–28 show driving waveforms used in the present invention for suppressing the above-mentioned "fluctuation".

Figure 22:
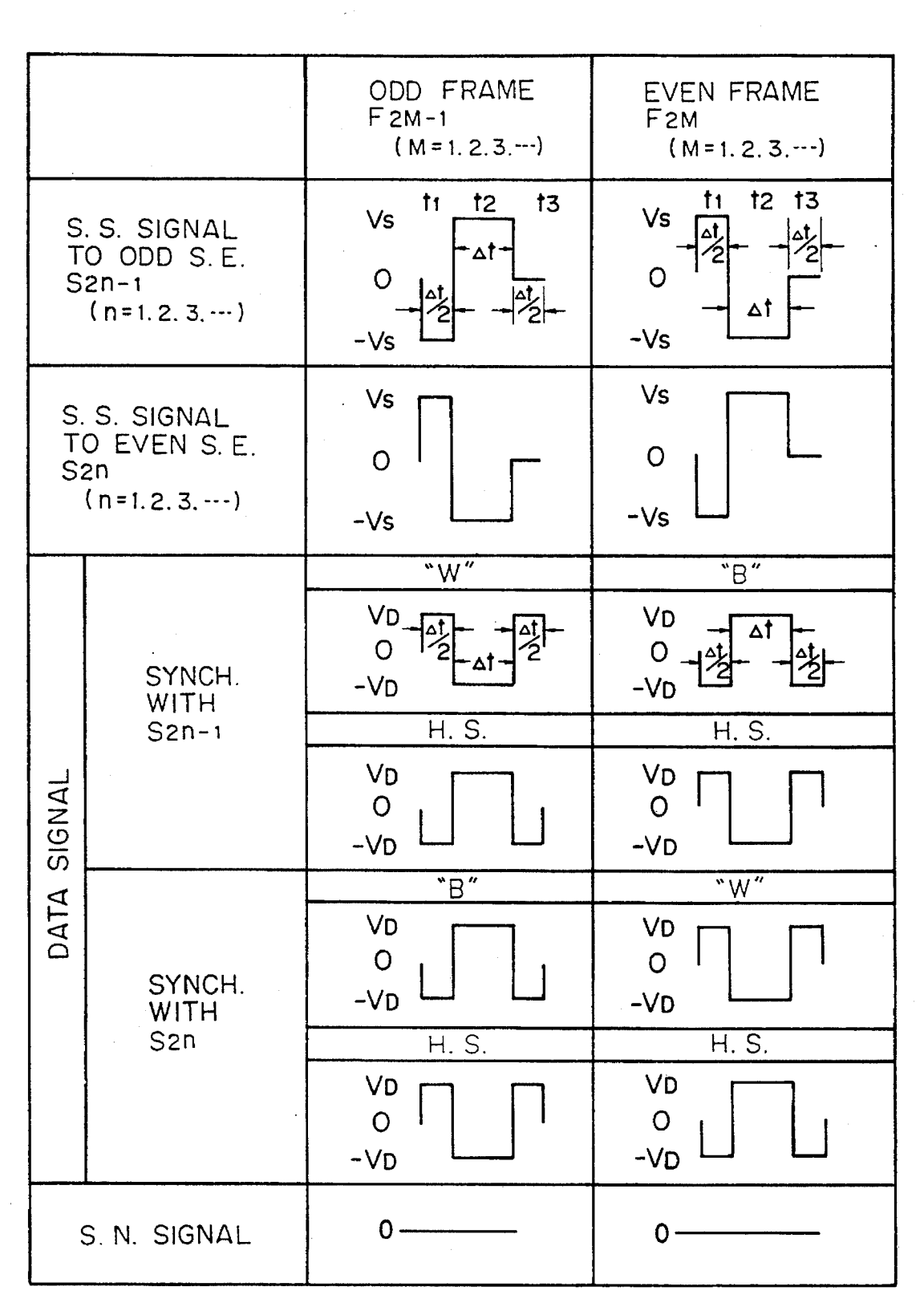

In the driving embodiment shown in FIG. 22, an odd-numbered scanning electrode is supplied with a scanning selection signal S$_{2n-1}$ (n=1, 2, 3, . . .) in an odd-numbered frame F$_{2M-1}$ (M=1, 2, 3, . . .). The signal S$_{2n-1}$ comprises a voltage −V$_S$ (with respect to the voltage of a scanning non-selection signal) at a first phase t$_1$, a voltage V$_S$ at a second phase t$_2$ and a voltage 0 at a final phase t$_3$. The pulse duration of the voltage V$_S$ at phase t$_2$ is set to be at least twice, preferably twice, the pulse duration of the voltage −V$_S$ at phase t$_1$. Further, an even-numbered scanning electrode is supplied with a scanning non-selection signal S$_{2n}$ (n=1, 2, 3, . . .) in an odd-numbered frame F$_{2M-1}$ (M=1, 2, 3, . . .). The signal S$_{2n}$ comprises voltages of opposite polarities to those of the scanning selection signal S$_{2n-1}$ at phases t$_1$ and t$_2$, respectively.

On the other hand, in an even-numbered frame $F_{2M}$ (M=1, 2, 3, . . .), a scanning non-selection signal $S_{2n-1}$ applied to an odd-number scanning electrode has the same waveform as the scanning selection signal $S_{2n}$ applied in the odd-numbered frame $F_{2M-1}$, and a scanning non-selection signal $S_{2n}$ applied to an even-numbered scanning electrode has the same waveform as the scanning selection signal $S_{2n-1}$ applied in the odd-numbered frame $F_{2M-1}$.

In synchronism with the above scanning selection signals, the data electrodes are selectively supplied with a white signal, a black signal or a hold signal. The white signal comprises a voltage $V_D$ synchronized at phase $t_1$, a voltage $-V_D$ synchronized at phase $t_2$ and a voltage $V_D$ synchronized at phase $t_3$. Accordingly, the pulse duration of the voltage $-V_D$ at phase $t_2$ of the white signal is likewise set to be at least twice, preferably twice, the pulse duration of the voltage $V_D$ at the first phase $t_1$. Further, of the data signals, the black signal comprises voltages of opposite polarities to those of the white signal at phases $t_1$, $t_2$ and $t_3$, respectively.

In the odd frame $F_{2M-1}$, a hold signal synchronized with the scanning selection signal $S_{2n-1}$ is set to have the same waveform as the above-mentioned black signal, and a hold signal synchronized with the scanning selection signal $S_{2n}$ is set to have the same waveform as the above-mentioned white signal.

Further, in the even frame $F_{2M}$, a hold signal synchronized with the scanning selection signal $S_{2n-1}$ is set to have the same waveform as the white signal, and a hold signal synchronized with the scanning selection signal $S_{2n}$ is set to have the same waveform as the black signal.

In the driving embodiment shown in FIG. 22, the maximum duration (Tb) of a single polarity voltage applied to a pixel at the time of non-selection is $\Delta t$ so that it has become possible to solve the problem caused in the prior art embodiment where the maximum duration has been $2\Delta t$.

Figure 23:
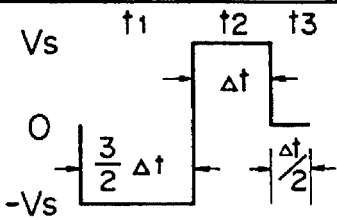

FIG. 23 shows a driving embodiment which is a modification of the one shown in FIG. 22. In the embodiment shown in FIG. 23, scanning selection signals $S_{2n-1}$ and $S_{2n}$ are respectively set to have voltages of $V_S$ (or $-V_S$) and $-V_S$ (or $V_S$) of mutually opposite polarities at a first phase $t_1$, and a second phase $t_2$ and are both set to have a voltage of zero at a last phase $t_3$. The signals are set to have a pulse duration of $\Delta t$ at phase $t_2$ and a pulse duration of $\frac{3}{2}\cdot\Delta t$ at phase $t_1$, and the voltage $0$ is set to have a duration of $\Delta t/2$.

A white signal, a black signal and a hold signal comprise voltages $V_D$ and $-V_D$ of mutually opposite polarities applied in synchronism with phase $t_1$ of the scanning selection signals $S_{2n-1}$ and $S_{2n}$. Of these voltages, a first applied voltage $V_D$ or $-V_D$ is set to have a pulse duration $\Delta t/2$ and a next applied voltage $-V_D$ or $V_D$ is set to have a duration $\Delta t$. Further, at phases $t_2$ and $t_3$, the white signal, black signal and hold signal comprise a voltage $V_D$ or $-V_D$ with a pulse duration $\Delta t$ and a voltage $-V_D$ or $V_D$ with a pulse duration $\Delta t/2$.

In the driving embodiment shown in FIG. 23, the maximum duration Tb of a single polarity applied to a pixel at the time of non-selection is also suppressed to $\Delta t$.

In the embodiments shown in FIGS. 24–28, the maximum duration Tb of a single polarity applied to a pixel at the time of non-selection is suppressed to $\Delta t$, so that the above-mentioned problem of "fluctuation" caused in prior art multiplex driving can be solved.

Incidentally, the above-mentioned $\Delta t$ has been set equal to the maximum duration (time) of voltages $V_D$ and $-V_D$ used in the data signals.

In the present invention, various types of ferroelectric liquid crystal devices can be used, including an SSFLC device as disclosed by Clark et al. in U.S. Pat. No. 4,367,924, etc., a ferroelectric liquid crystal device having an alignment with a remaining helical texture as disclosed by Isogai, et al. in U.S. Pat. No. 4,586,791, and a ferroelectric liquid crystal device having an alignment state as disclosed in G. B. Laid-Open Patent Application GB-A 2,159,635. The ferroelectric liquid crystal device disclosed in GB-A 2,159,635 includes an alignment state providing a tilt angle (an angle between an average molecular axis direction of liquid crystal molecules and a uniaxial orientation axis such as a rubbing axis) under no electric field which is smaller than that under the application of an electric field.

In the present invention, it is possible to use a ferroelectric liquid crystal having a positive or negative dielectric anisotropy. Particularly, in the case of a device using a ferroelectric liquid crystal having a negative dielectric anisotropy, it is preferred to apply an AC voltage at a high frequency (e.g., 10 kHz or higher) to pixels under non-selection. Such AC application methods are disclosed in, e.g., Japanese Laid-Open Patent Applications JP-A 61-249025, 61-249024, 61-246724, 61-246723, 61-246722, and 61-245142.

In FIGS. 22–28A, there have been disclosed driving embodiments wherein the polarity of the scanning selection signal is inverted for each frame and for each line. It is however possible to adopt an embodiment wherein the polarity of the scanning selection signal is inverted only for each frame or inverted every second or fourth frame scanning.

Figure 28B:
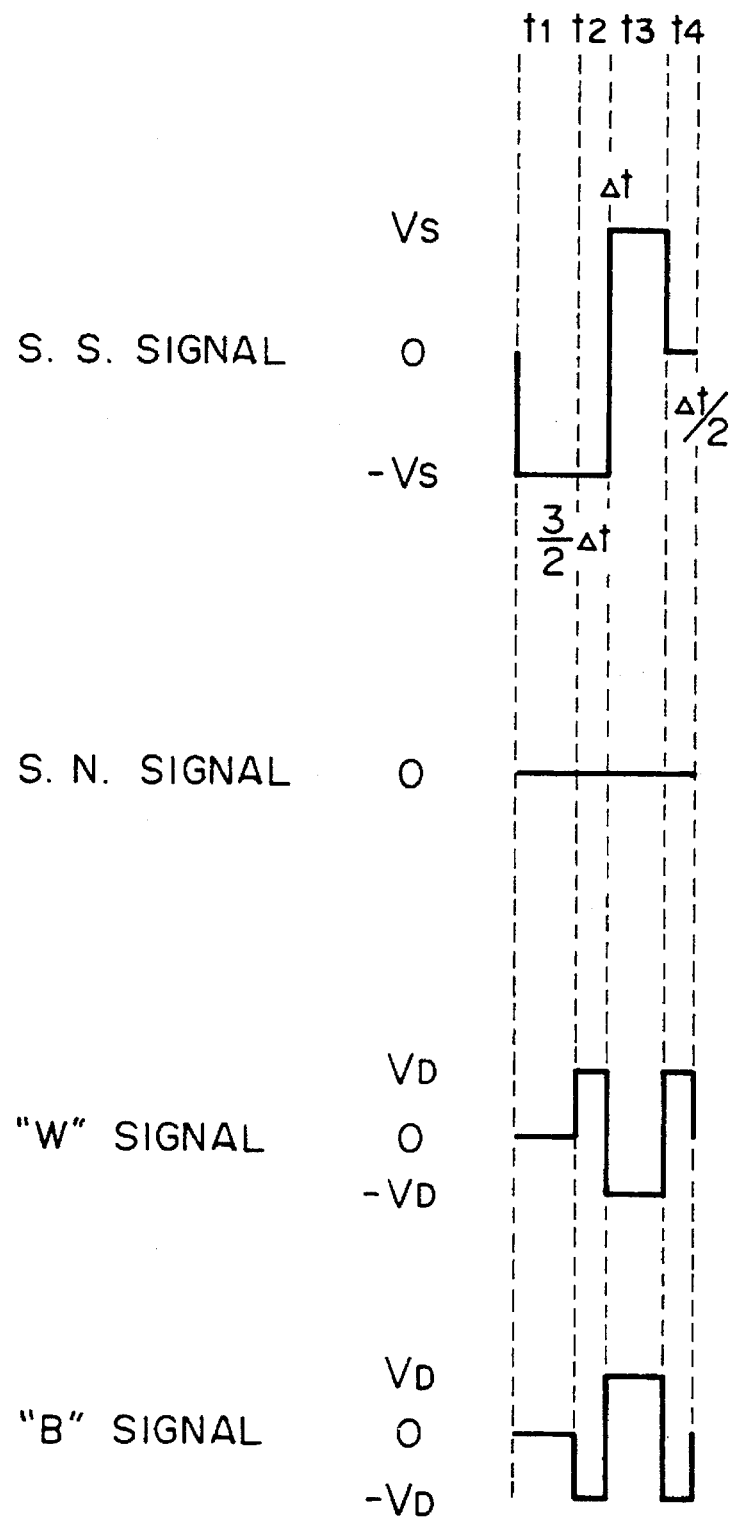

In the present invention, it is further possible not to use the polarity inversion of a scanning selection signal. FIG. 28B shows such a driving embodiment. In the embodiment shown in FIG. 28B, at the time of scanning one line, all the pixels on the one line are erased in phases $t_1$ and $t_2$, and the pixels on the one line are selected into either white or black. In this instance, in the erasure in the phases $t_1$ and $t_2$ of the present invention, it is preferred to erase the pixels into black. For this purpose, it is ordinary to dispose a polarization axis in parallel with the molecular axis of the liquid crystal at the pixels oriented as a result of the application of the voltages in the phases $t_1$ and $t_2$. Alternatively, it is also possible to set the angle between the uniaxial orientation axis and a polarization axis to an angle which is smaller than the maximum tilt angle under the application of the erasure voltage. If the pixels are erased into a black (dark) state, little flushing into a white (bright) state is encountered so that a driving at a relatively low frame frequency becomes possible.

Herein, a specific example is shown hereinbelow.

EXAMPLE

A ferroelectric liquid crystal device was composed to have a number of pixels of 400 (number of scanning electrodes)×800 (number of data electrodes) by using a ferroelectric liquid crystal showing a negative dielectric anisotropy ("CS1017", available from Chisso K. K.) which showed the following phase transition characteristic.

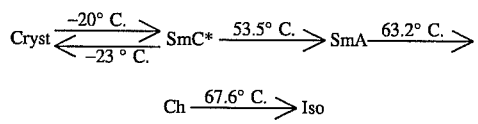

wherein the respective symbols denote the following phases.

| | |
|---|---|
| Cryst: | crystal phase |
| SmC*: | chiral smectic phase |
| SmA: | smectic A phase |
| Ch: | cholesteric phase |
| Iso: | isotropic phase. |

The ferroelectric liquid crystal showed a spontaneous polarization ($P_S$) of 9.0 nC/cm$^2$ and disposed in a layer thickness of 1.5 micron between a pair of substrates having the above-mentioned scanning electrodes and data electrodes coated with polyimide films which had been rubbed in parallel with each other.

The ferroelectric liquid crystal device was driven by using driving waveforms shown in FIGS. 22–28 wherein the voltages $\pm V_S$ were set to $\pm 18$ volts and $\pm V_D$ were set to $\pm 6$ volts, whereby a drive margin of one-line scanning time and a static pixel contrast $C_R$ (transmittance in the bright state/ transmittance in the dark state) were measured. The results are shown in the following table.

Figure 25:
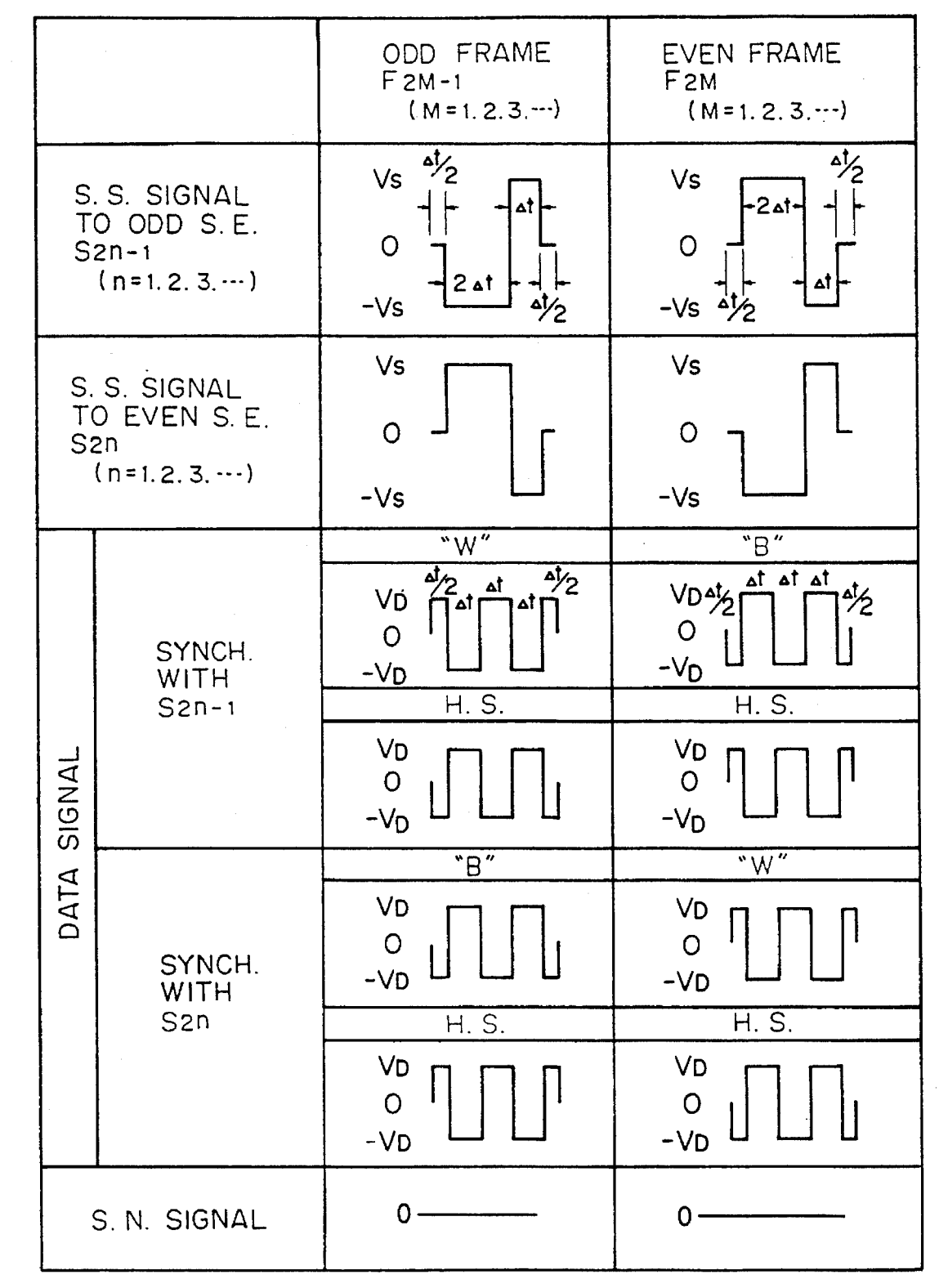
Figure 26:
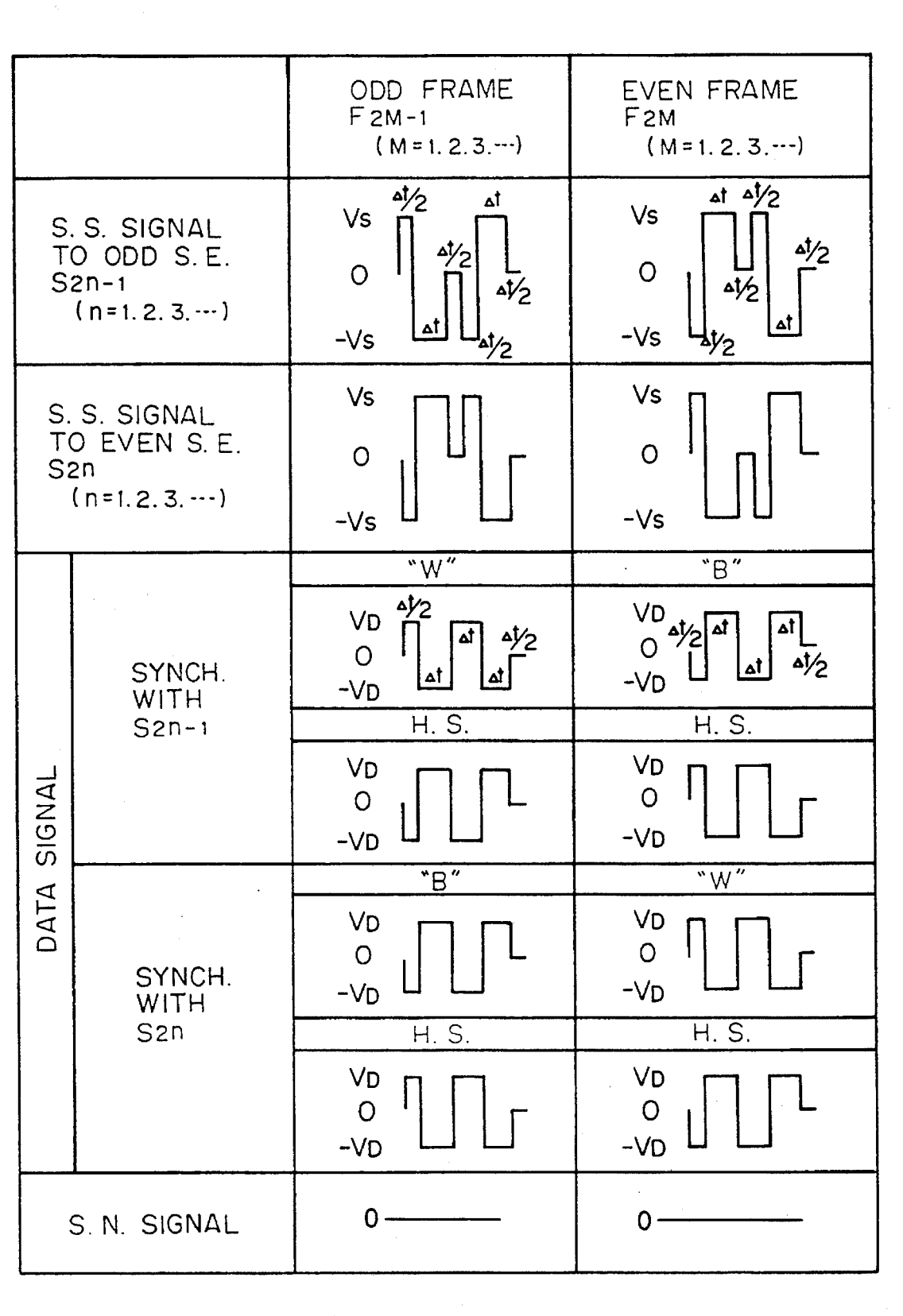
Figure 27:
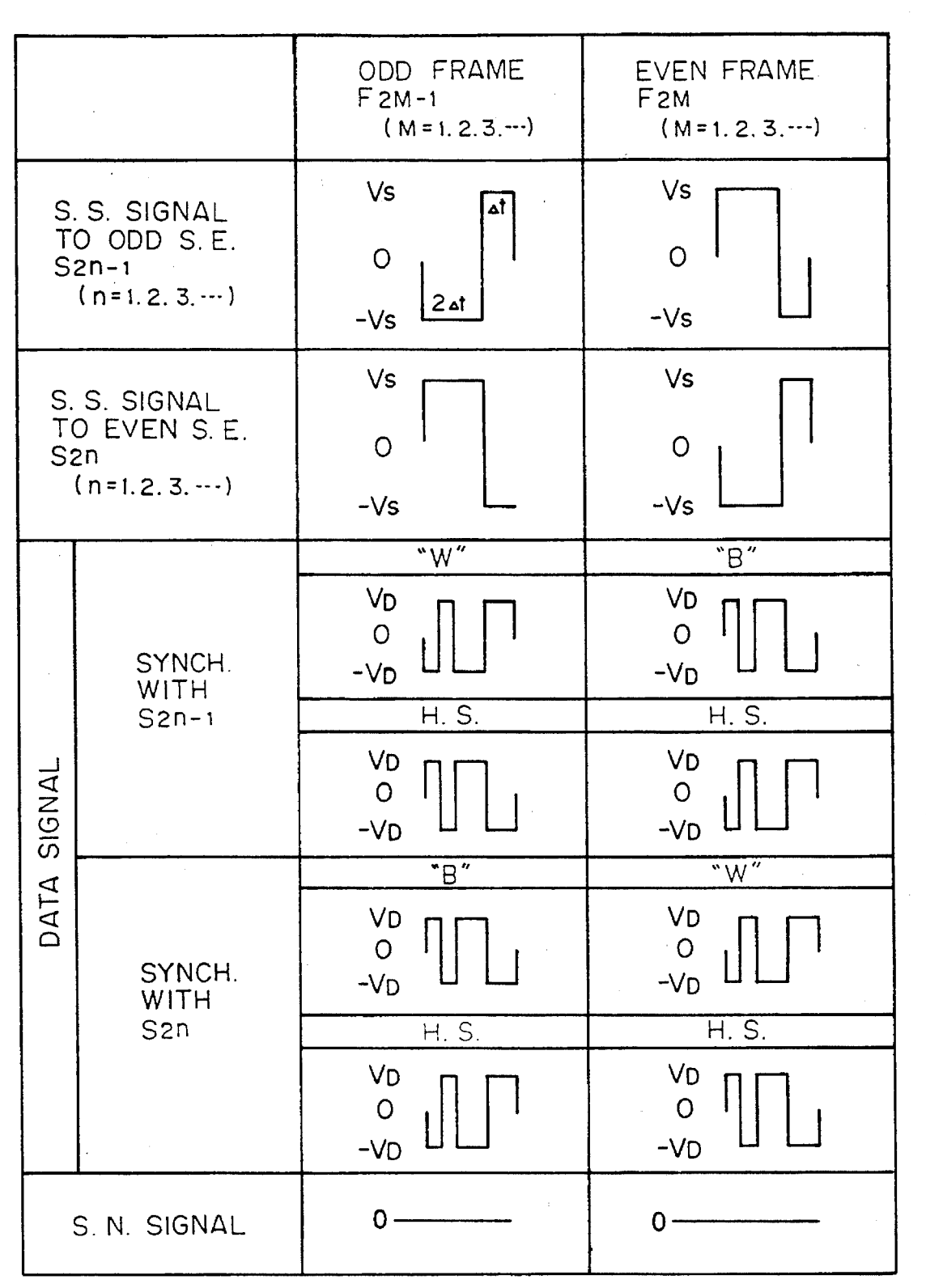

| Example No. | Drive waveform | One-line scanning time (μsec) | Contrast $C_R$ |
|---|---|---|---|
| Example 1 | FIG. 22 | 84–96 | 6.2 |
| Example 2 | FIG. 23 | 144–152 | 4.9 |
| Example 3 | FIG. 24 | 202–236 | 5.1 |
| Example 4 | FIG. 25 | 198–250 | 5.3 |
| Example 5 | FIG. 26 | 160–184 | 5.1 |
| Example 6 | FIG. 27 | 164–176 | 5.1 |
| Example 7 | FIG. 28 | 140–162 | 5.8 |
| Comparative Example 1 | FIG. 18 | 102–120 | 5.8–6.3 |

In the examples of the present invention, no pale black stripes as shown in FIG. 20 were observed within the drive margins whereby pictures of a good quality were provided. In contrast thereto, in the comparative example, the resultant contrast was not constant and stripes were observed to provide a picture of a lower quality.

Figure 29:
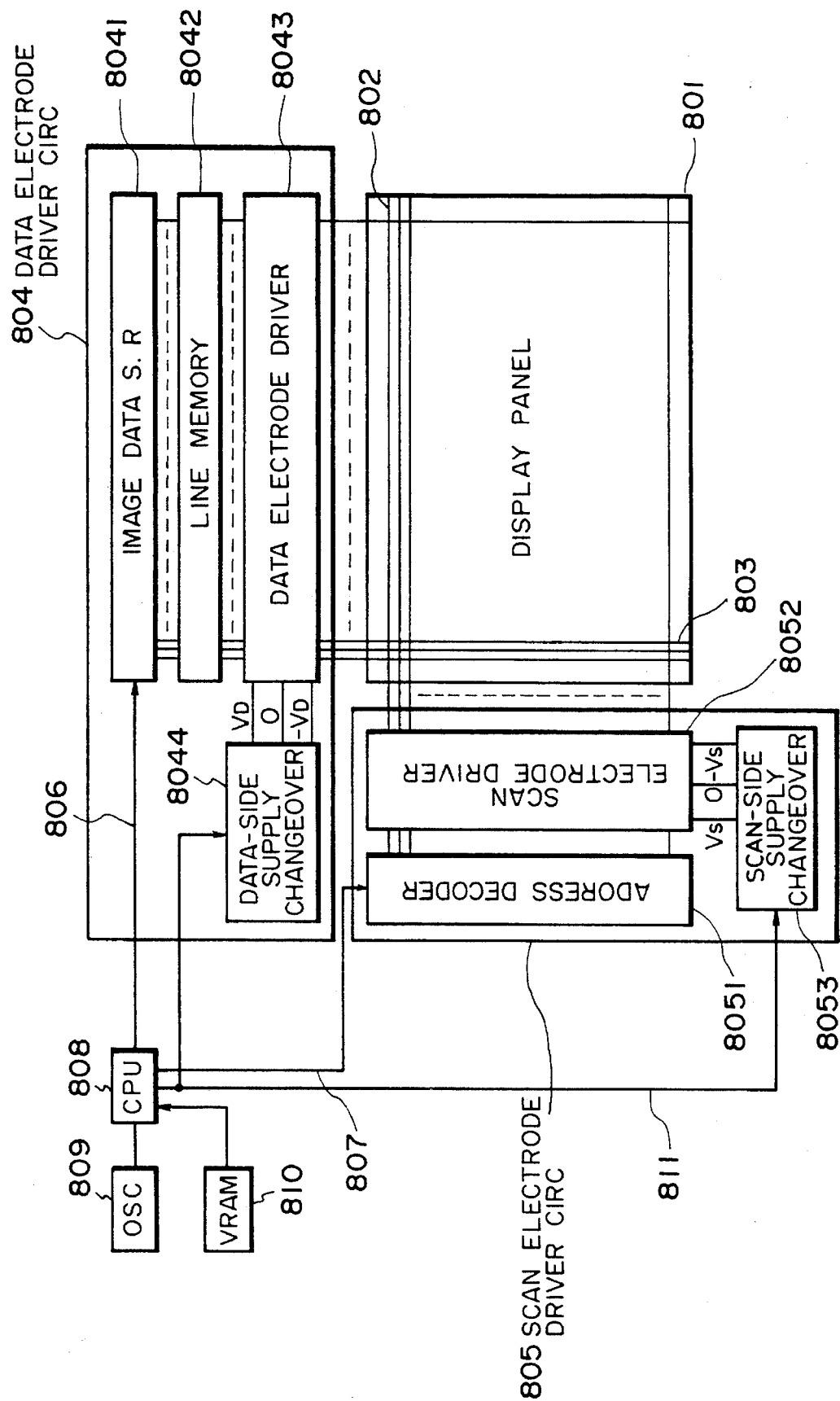
FIG. 29 is a block diagram of a liquid crystal apparatus according to the invention.

FIG. 29 is a block diagram illustrating a structural arrangement of an embodiment of the display apparatus according to the present invention. A display panel 801 is composed of scanning electrodes 802, data electrodes 803 and a ferroelectric liquid crystal disposed therebetween. The orientation of the ferroelectric liquid crystal is controlled by an electric field at each intersection of the scanning electrodes and data electrodes formed due to voltages applied across the electrodes.

The display apparatus includes a data electrode driver circuit 804, which in turn comprises an image data shift register 8041 for storing image data serially supplied from a data signal line 806, a line memory 8042 for storing image data supplied in parallel from the image data shift register 8041, a data electrode driver 8043 for supplying voltages to data electrodes 803 according to the image data stored in the line memory 8042, and a data side power supply changeover unit 8044 for changing over among voltages $V_D$, 0 and $-V_D$ supplied to the data electrodes 803 based on a signal from a changeover control line 811.

The display apparatus further includes a scanning electrode driver circuit 805, which in turn comprises a decoder 8051 for designating a scanning electrode among all the scanning electrodes based on a signal received from a scanning address data line 807, a scanning electrode driver 8052 for applying voltages to the scanning electrodes 802 based on a signal from the decoder 8051, and a scanning side power supply changeover unit 8053 for changing over among voltages $V_S$, 0 and $-V_S$ supplied to the scanning electrodes 802 based on a signal from a changeover control line 811.

The display apparatus further includes a CPU 808, which receives clock pulses from an oscillator 809, controls the image memory 810, and controls the signal transfer over the data signal line 806, scanning address data line 807 and changeover control line 811.

As the ferroelectric liquid crystal showing bistability used in the present invention, chiral smectic liquid crystals having ferroelectricity are most preferred. Among these liquid crystals, a liquid crystal in chiral smectic C phase (SmC*) or H phase (SmH*) is particularly suited. These ferroelectric liquid crystals are described in, e.g., "LE JOURNAL DE PHYSIQUE LETTERS" 36 (L-69), 1975 "Ferroelectric Liquid Crystals"; "Applied Physics Letters" 36 (11) 1980, "Submicro-Second Bistable Electrooptic Switching in Liquid Crystals"; "Kotai Butsuri (Solid State Physics)" 16 (141), 1981 "Liquid Crystal"; U.S. Pat. Nos. 4,556,727, 4,561,726, 4,614,609, 4,589,996 and 4,592,858. Ferroelectric liquid crystals disclosed in these publications may be used in the present invention.

More particularly, examples of ferroelectric liquid crystal compound used in the present invention are decyloxybenzylidene-p'-amino-2-methylbutylcinnamate (DOBAMBC), hexyloxybenzylidene-p'-amino-2-chloropropylcinnamate (HOBACPC), 4-O-(2-methyl)-butylresorcilidene-4'-octylaniline (MBRA 8), etc.

When a device is constituted by using these materials, the device may be supported with a block of copper, etc. in which a heater is embedded in order to realize a temperature condition where the liquid crystal compounds assume an SmC*- or SmH*-phase.

Further, in the present invention, it is possible to use a ferroelectric liquid crystal in chiral smectic F phase, I phase, G phase or K phase in addition to the above mentioned SmC* and SmH* phases.

Figure 30:
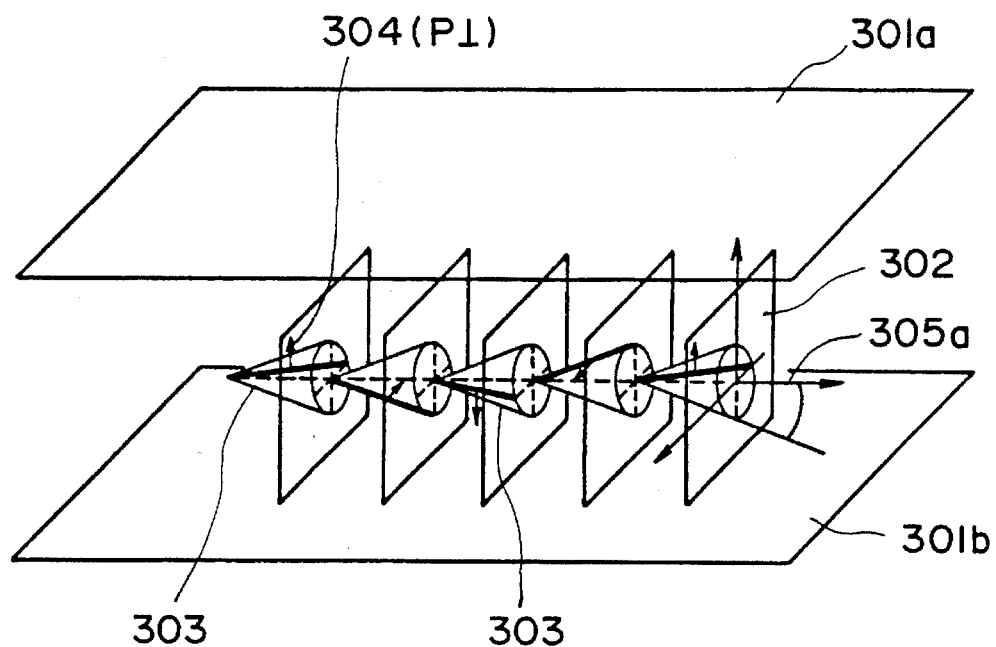
FIGS. 30 and 31 are schematic perspective views for explaining operation principle of a ferroelectric liquid crystal device used in the invention.
Figure 31:
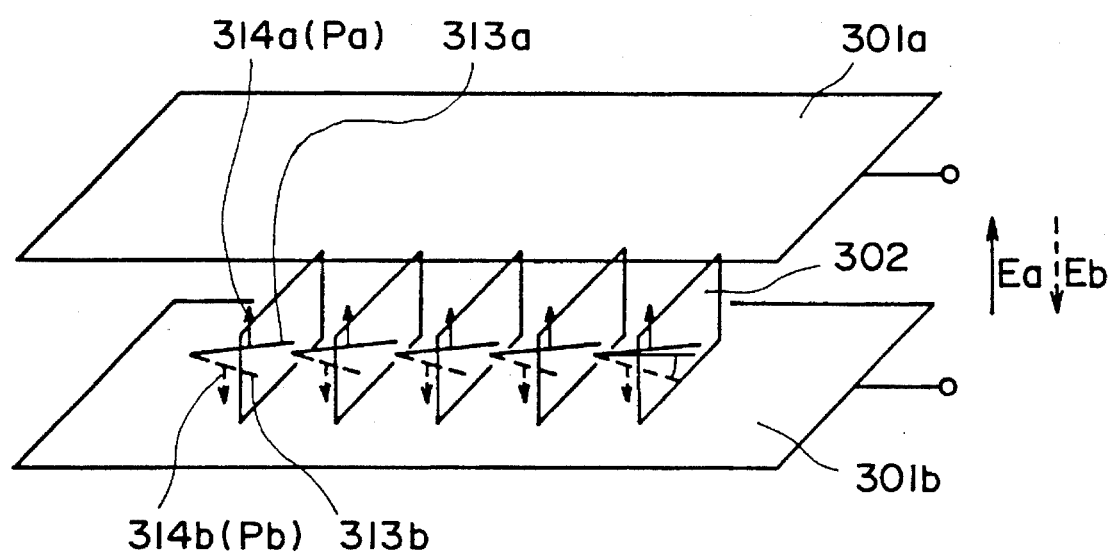

Referring to FIG. 30, there is schematically shown an example of a ferroelectric liquid crystal cell. Reference numerals 301a and 301b denote substrates (glass plates) on which a transparent electrode of, e.g., In$_2$O$_3$, SnO$_2$, ITO (Indium-Tin-Oxide), etc., is disposed, respectively. A liquid crystal of an SmC*-phase in which liquid crystal molecular layers 302 are oriented perpendicular to surfaces of the glass plates is hermetically disposed therebetween. A full line 303 shows liquid crystal molecules. Each liquid crystal molecule 303 has a dipole moment (P⊥) 304 in a direction perpendicular to the axis thereof. When a voltage higher than a certain threshold level is applied between electrodes formed on the base plates 301a and 301b, a helical or spiral structure of the liquid crystal molecule 303 is unwound or released to change the alignment direction of respective liquid crystal molecules 303 so that the dipole moment (P⊥) 304 are all directed in the direction of the electric field. The liquid crystal molecules 303 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage. Further, when the thickness of the liquid crystal cell is sufficiently thin (e.g., 1 micron), the helical structure of the liquid crystal molecules is released without application of an electric field whereby the dipole moment assumes either of the two states, i.e., Pa in an upper direction 314a or Pb in a lower direction 314b, thus providing a bistability condition, as shown in FIG. 31. When an electric field Ea or Eb higher than a certain threshold level and different from each other in polarity as shown in FIG. 31 is applied to a cell having the above-mentioned characteristics, the dipole moment is directed either in the upper direction 314a or in the lower direction 314b depending on the vector of the electric field Ea or Eb. In correspondence with this, the liquid crystal molecules are oriented to either a first orientation state 313a or a second orientation state 313b.

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g., with reference to FIG. 31. When the electric field Ea is applied to the liquid crystal molecules, they are oriented in the first stable state 313a. This state is stably retained even if the electric field is removed. On the other hand, when the electric field Eb of which direction is opposite to that of the electric field Ea is applied thereto, the liquid crystal molecules are oriented to the second orientation state 313b, whereby the directions of molecules are changed. Likewise, the latter state is stably retained even if the electric field is removed. Further, as long as the magnitude of the electric field Ea or Eb being applied is not above a certain threshold value, the liquid crystal molecules are placed in the respective orientation states. In order to effectively realize high response speed and bistability, it is preferable that the thickness of the cell is as thin as possible and generally 0.5 to 20 microns, particularly 1 to 5 microns.

As described above, according to the present invention, it is possible to suppress the occurrence of flickering even in a low frame frequency driving at a low temperature, thus providing an improved display quality. According to another aspect of the above effect, it has become possible to realize a high-quality display free from flickering over a wide temperature range ranging from a low temperature to a high temperature. The present invention further realizes a gradational display with suppression of flickering caused by scanning drive at a low frequency.

According to the present invention, it is also possible to have a large drive margin and provide a constant contrast. Particularly, it is possible to prevent the occurrence of a pale black background stripe pattern and provide a high-quality display free from image flow.

What is claimed is:

1. A liquid crystal apparatus, comprising:
   (a) a liquid crystal device comprising an electrode matrix composed of a group of horizontal scanning electrodes and a group of vertical data electrodes, and a ferroelectric liquid crystal, said data electrodes being formed in at least two different electrode widths; and
   (b) driving means including first drive means for sequentially applying, in one vertical scanning, a scanning selection signal to successively select scanning electrodes which are two or more scanning electrodes apart and for effecting one picture scanning by scanning said group of scanning electrodes in at least seven vertical scannings, and a second drive means for applying data signals to said group of data electrodes in synchronism with the scanning selection signal,
   wherein, during a latter one of two consecutive vertical scannings, the scanning selection signal is applied to scanning electrodes which are not adjacent to scanning electrodes to which the scanning selection signal was applied in a former one of the two consecutive vertical scannings.

2. An apparatus according to claim 1, wherein said first drive means comprises means for applying the scanning selection signal to scanning electrodes which are 4 or more scanning electrodes apart in one vertical scanning.

3. An apparatus according to claim 1, wherein said at least two different electrode widths provide width ratios of 1:2:4: . . . :$2^{n-1}$, where n is an integer equal to at least two.

4. A liquid crystal apparatus, comprising:
   (a) a liquid crystal device comprising an electrode matrix composed of a group of horizontal scanning electrodes and a group of vertical data electrodes, and a chiral smectic liquid crystal, said data electrodes being formed in at least two different electrode widths;
   (b) a first driver for sequentially applying, in one vertical scanning, a scanning selection signal to successively select scanning electrodes which are two or more scanning electrodes apart and for effecting one picture scanning by scanning said group of scanning electrodes in at least seven vertical scannings; and
   (c) a second driver for applying data signals to said group of data electrodes in synchronism with the scanning selection signal,
   wherein, during a latter one of two consecutive vertical scannings, the scanning selection signal is applied to scanning electrodes which are not adjacent to scanning electrodes to which the scanning selection signal was applied in a former one of the two consecutive vertical scannings.

5. A liquid crystal apparatus, comprising:
   (a) a liquid crystal device comprising an electrode matrix composed of a group of horizontal scanning electrodes and a group of vertical data electrodes, and a ferroelectric liquid crystal, said data electrodes being formed in at least two different electrode widths; and
   (b) driving means including first drive means for sequentially applying, in one vertical scanning, a scanning selection signal to successively select scanning electrodes which are two or more scanning electrodes apart and for effecting one picture scanning by scanning said group of scanning electrodes in at least five vertical scannings, and a second drive means for applying data signals to said group of data electrodes in synchronism with the scanning selection signal,
   wherein, during a latter one of two consecutive vertical scannings, the scanning selection signal is applied to scanning electrodes which are not adjacent to scanning electrodes to which the scanning selection signal was applied in a former one of the two consecutive vertical scannings.

6. An apparatus according to claim 5, wherein said first drive means comprises means for applying the scanning selection signal to scanning electrodes which are 4 or more scanning electrodes apart in one vertical scanning.

7. An apparatus according to claim 5, wherein said at least two different electrode widths provide width ratios of 1:2:4: . . . :$2^{n-1}$, where n is an integer equal to at least two.

8. A liquid crystal apparatus, comprising:
   (a) a liquid crystal device comprising an electrode matrix composed of a group of horizontal scanning electrodes and a group of vertical data electrodes, and a chiral smectic liquid crystal, said data electrodes being formed in at least two different electrode widths;

(b) a first driver for sequentially applying, in one vertical scanning, a scanning selection signal to successively select scanning electrodes which are two or more scanning electrodes apart and for effecting one picture scanning by scanning said group of scanning electrodes in at least five vertical scannings; and (c) a second driver for applying data signals to said group of data electrodes in synchronism with the scanning selection signal, wherein, during a latter one of two consecutive vertical scannings, the scanning selection signal is applied to scanning electrodes which are not adjacent to scanning electrodes to which the scanning selection signal was applied in a former one of the two consecutive vertical scannings.

* * * * *

UNITED STATES PATENT AND TRADEMARK OFFICE
CERTIFICATE OF CORRECTION

PATENT NO. : 5,506,601

DATED : April 9, 1996

INVENTOR(S) : TADASHI MIHARA, ET AL.

It is certified that error appears in the above-identified patent and that said Letters Patent is hereby corrected as shown below:

Item:
[57] ABSTRACT

Line 8, "so at" should read --so as--.

COLUMN 4

Line 65, "a" should be deleted, and "then" should read --than--.

COLUMN 5

Line 67, "ai" should read --a--.

COLUMN 7

Line 10, "signal" should read --signals--.

COLUMN 11

Line 24, "$F_1$ $F_2$ $F_3$ $F_4$ $F_5$ $F_6$ $F_7$" should read:

$$\text{TABLE 5}$$

$$-- \quad F_1 \ F_2 \ F_3 \ F_4 \ F_5 \ F_6 \ F_7 \quad --$$

UNITED STATES PATENT AND TRADEMARK OFFICE
CERTIFICATE OF CORRECTION

PATENT NO. : 5,506,601

DATED : April 9, 1996

INVENTOR(S) : TADASHI MIHARA, ET AL.

It is certified that error appears in the above-identified patent and that said Letters Patent is hereby corrected as shown below:

<u>COLUMN 13</u>

Line 62, "white," should read --white)"--; and

Line 67, "a" should be deleted.

<u>COLUMN 17</u>

Line 10, "micron" should read --microns--.

Signed and Sealed this

Tenth Day of September, 1996

BRUCE LEHMAN

Attest:

*Attesting Officer*      *Commissioner of Patents and Trademarks*